(12) United States Patent  
Matsuno et al.

(10) Patent No.: US 8,184,740 B2
(45) Date of Patent: May 22, 2012

(54) SIGNAL PROCESSING CIRCUIT

(75) Inventors: Noriaki Matsuno, Tokyo (JP); Kiyoshi Yanagisawa, Tokyo (JP)

(73) Assignee: NEC Corporation, Tokyo (JP)

( * ) Notice: Subject to any disclaimer, the term of this patent is extended or adjusted under 35 U.S.C. 154(b) by 747 days.

(21) Appl. No.: 12/297,912

(22) PCT Filed: Mar. 6, 2007

(86) PCT No.: PCT/JP2007/054324
§ 371 (c)(1),
(2), (4) Date: Oct. 21, 2008

(87) PCT Pub. No.: WO2007/122880
PCT Pub. Date: Nov. 1, 2007

(65) Prior Publication Data
US 2010/0239056 A1   Sep. 23, 2010

(30) Foreign Application Priority Data

Apr. 21, 2006   (JP) ................................. 2006-117899

(51) Int. Cl.
*H03C 3/00* (2006.01)
(52) U.S. Cl. ........ 375/302; 375/327; 375/226; 375/298; 375/296; 375/297; 327/284; 327/307
(58) Field of Classification Search .................. 375/346, 375/298, 296, 297, 302, 327, 261, 226; 327/307, 327/284
See application file for complete search history.

(56) References Cited

U.S. PATENT DOCUMENTS

| 6,741,662 B1* | 5/2004 | Francos et al. ................ 375/297 |
| 7,292,833 B2* | 11/2007 | Marro et al. ................... 455/296 |
| 7,944,984 B1* | 5/2011 | Wu et al. ....................... 375/261 |
| 2005/0129141 A1* | 6/2005 | Lee ................................. 375/298 |
| 2009/0261918 A1* | 10/2009 | Walkington .................... 332/103 |
| 2010/0195706 A1* | 8/2010 | Yanagisawa et al. .......... 375/226 |
| 2010/0278285 A1* | 11/2010 | Lin ................................ 375/327 |

FOREIGN PATENT DOCUMENTS

| JP | 05-227239 | 9/1993 |
| JP | 6-350658 | 12/1994 |
| JP | 8-213846 | 8/1996 |
| JP | 9-504673 | 5/1997 |
| JP | 11-8658 | 1/1999 |
| JP | 11-136302 | 5/1999 |
| JP | 2001-339452 | 12/2001 |
| JP | 2002-064411 | 2/2002 |
| JP | 2002-252663 | 9/2002 |

(Continued)

*Primary Examiner* — Eva Puente
(74) *Attorney, Agent, or Firm* — Young & Thompson

(57) ABSTRACT

Test signal generator (3) generates test signals represented, by four points, which comprise two sets of two points positioned in point symmetry with respect to the origin of an I/Q orthogonal coordinate system. Envelope detector (8) detects the amplitude of an envelope of the output signal from an orthogonal modulator when the test signals represented by four points are generated, and outputs a signal proportional to the square of the amplitude. Comparing unit (9) calculates an average value of output signals from envelope detector ( ) when the test signals represented by the two points of each set are generated. Controller (10) adjusts the amplitudes and/or phases of the test signals so that the average values produced when the test signals represented by the two sets of the two points are generated are equal to each other, and calculates an I/Q mismatch quantity based on the adjusted results.

23 Claims, 28 Drawing Sheets

FOREIGN PATENT DOCUMENTS

| | | |
|---|---|---|
| JP | 2003-101061 | 12/2003 |
| JP | 2004-007083 | 1/2004 |
| JP | 2004-509555 | 3/2004 |
| JP | 2004-274288 | 9/2004 |
| JP | 2004-363757 | 12/2004 |
| JP | 2005-252631 | 9/2005 |
| JP | 2006-115463 | 4/2006 |

* cited by examiner

SIGNAL PROCESSING CIRCUIT

TECHNICAL FIELD

The present invention relates to a signal processing circuit in a transmission apparatus for orthogonally modulating a transmission baseband signal including an I (in-phase) component and a Q (quadrature) component, and more particularly to a technology for improving the modulation accuracy of orthogonal modulation.

BACKGROUND ART

In signal processing circuits of the type described above, it is indispensable performance requirements to suppress a carrier leak and prevent the modulation accuracy from being lowered in orthogonal modulators for achieving communication quality and complying with rules and regulations.

The carrier leak corresponds a DC offset of I/O components as converted into an input to the orthogonal modulator. Factors that affect the modulation accuracy of the orthogonal modulator include a variation (a factor responsible for an I/Q mismatch to be described later) in the levels of I/O components as converted into an input to the orthogonal modulator, and a variation (a factor responsible for an I/Q mismatch to be described later) in the orthogonality of a local signal input to the orthogonal modulator, i.e., the amplitudes of and the phase difference between the I/O components.

As the rate of communications has become higher in recent years, however, the above performance requirements, though they have been required to be met at higher levels, tend to be lowered due to circuit limitations posed by a direct conversion architecture and a lower process voltage.

Therefore, it is essential for the signal processing circuit to have a means for compensating for a DC offset and an I/Q mismatch (an I/Q amplitude mismatch and an I/Q phase mismatch) of the orthogonal modulator.

The I/Q amplitude mismatch refers to a discrepancy between the amplitudes of the I/O components of an output signal from the orthogonal modulator. The I/Q amplitude mismatch may be caused by three factors, i.e., (1) a discrepancy between the amplitudes of the I/O components of a local signal input to the orthogonal modulator, (2) a discrepancy between the amplitudes of the I/O components of a transmission baseband signal input to the orthogonal modulator, and (3) a discrepancy between the gains of I and Q component paths in the orthogonal modulator.

The I/Q phase mismatch refers to a deviation from 90 degrees of the phase difference between the I/O components of an output signal from the orthogonal modulator. The I/Q phase mismatch may be caused by three factors, i.e., (1) a deviation from 90 degrees of the phase difference between the I/O components of a local signal input to the orthogonal modulator, (2) a deviation from 90 degrees of the phase difference between the I/O components of a transmission baseband signal input to the orthogonal modulator, and (3) a deviation of the phases of I and Q component paths in the orthogonal modulator.

Heretofore, there have been proposed many signal processing circuits incorporating a means for compensating for a DC offset and an I/Q mismatch of the orthogonal modulator. However, it is ideal for nearly no hardware to be added for compensation. In this respect, much remains to be improved in signal processing circuits of the background art.

FIG. 1 is a diagram showing a structural example of a signal processing circuit of the background art.

As shown in FIG. 1, the signal processing circuit of the background art comprises transmission BB (BaseBand) signal generator 101, test signal generator 103, switch 104, DC offset·I/Q mismatch compensator 102, D/A converters $105_I$, $105_Q$, mixers $106_I$, $106_Q$, adder 107, envelope detector 108, A/D converter 109, and compensation quantity generator 110.

Transmission BB signal generator 101 generates a transmission baseband signal in a transmitting process.

Test signal generator 103 generates test signals in a compensating process.

Switch 104 selects the test signals generated by test signal generator 103 in the compensating process, and selects the transmission baseband signal generated by transmission BB signal generator 101 in the transmitting process.

In the compensating process, a compensation quantity for compensating for a DC offset and an I/Q mismatch of an orthogonal modulator is set in DC offset·I/Q mismatch compensator 102 by compensation quantity generator 110. In the transmitting process, DC offset·I/Q mismatch compensator 102 corrects the transmission baseband signal generated by transmission BB signal generator 101 based on the compensation quantity set by compensation quantity generator 110.

D/A converter $105_I$ converts the I component of a signal output from DC offset·I/Q mismatch compensator 102 from a digital signal into an analog signal. D/A converter $105_Q$ converts the Q component of the signal output from DC offset·I/Q mismatch compensator 102 from a digital signal into an analog signal.

Mixer $106_I$ upconverts the I component of the signal converted by D/A converter $105_I$ by mixing it with the I component of a local signal. Mixer $106_Q$ upconverts the Q component of the signal converted by D/A converter $105_Q$ by mixing it with the Q component of the local signal.

Adder 107 adds the I component of the signal mixed by mixer $106_I$ and the Q component of the signal mixed by mixer $106_Q$ to each other. The signal that has thus been orthogonally modulated serves as an output signal of the signal processing circuit.

Envelope detector 108 detects the amplitude of the envelope of the output signal from the orthogonal modulator.

A/D converter 109 converts an output signal of envelope detector 108 from an analog signal into a digital signal.

Compensation quantity generator 110 calculates a DC offset quantity and an I/Q mismatch quantity of the orthogonal modulator based on the digital signal from A/D converter 109, generates a compensation quantity for compensating the DC offset and the I/Q mismatch, and sets the generated compensation quantity in DC offset·I/Q mismatch compensator 102.

Operation of the above signal processing circuit of the background art will be described below.

In the compensating process, switch 104 selects the test signals generated by test signal generator 103. The test signals are supplied through DC offset·I/Q mismatch compensator 102 and D/A converters $105_I$, $105_Q$ to baseband ports of the orthogonal modulator, which orthogonally modulates the test signals. The amplitude of the orthogonally modulated signal is detected by envelope detector 108, and the detected amplitude is converted into a digital signal by A/D converter 109. Based on the digital signal, compensation quantity generator 110 generates a compensation quantity.

FIG. 2 is a diagram showing typical test signals used to perform compensation on the orthogonal modulator. Typically, the test signals include an I component represented by a cosine wave and a Q component represented by a sine wave.

FIG. 3 is a diagram showing the constellation of an output signal from the orthogonal modulator in an ideal state. When the orthogonal modulator is in an ideal state, either one of the I component and the Q component is free of a DC offset, and there is no I/Q amplitude mismatch and no I/Q phase mismatch. In this case, the constellation is represented by a true circle with its center at the origin. Therefore, the envelope of the output signal from the orthogonal modulator is represented by the sine wave of a constant envelope.

FIG. 4 is a diagram showing the constellation of an output signal from the orthogonal modulator which suffers a DC offset. In this case, the constellation is represented by a circle whose center is shifted from the origin. Therefore, the envelope of the output signal from the orthogonal modulator increases and decreases with time.

FIG. 5 is a diagram showing the constellation of an output signal from the orthogonal modulator which suffers an I/Q amplitude mismatch. FIG. 6 is a diagram showing the constellation of an output signal from the orthogonal modulator which suffers an I/Q phase mismatch. In each case, the envelope of the output signal from the orthogonal modulator increases and decreases with time.

Compensation quantity generator 110 checks the period and phase with which the envelope of the output signal from the orthogonal modulator increases and decreases, against the phase and frequency of the test signals thereby to confirm how much DC offset, I/Q amplitude mismatch, and I/Q phase mismatch the orthogonal modulator is suffering, and generates a compensation quantity to be set in DC offset·I/Q mismatch compensator 102.

In the transmitting process, switch 104 selects the transmission baseband signal generated by transmission BB signal generator 101. The transmission baseband signal is input to DC offset·I/Q mismatch compensator 102 and corrected based on the compensation quantity already set in DC offset·I/Q mismatch compensator 102. The corrected signal is supplied through D/A converters $105_I$, $105_Q$ and input to the baseband ports of the orthogonal modulator, which orthogonally modulates the test signals. The signal that has thus been orthogonally modulated serves as an output signal of the signal processing circuit.

A technology similar to the above technology is disclosed in Patent document 1. Patent document 1 discloses a method of compensating for an I/Q phase mismatch of an orthogonal modulator using only two points in the first through fourth quadrants of an I/Q orthogonal coordinate system. According to this method, test signals are simplified.

Another technology similar to the above technology is disclosed in Patent document 2. Patent document 2 discloses a method of inputting sine-wave test signals to the baseband ports of an orthogonal modulator for compensation.

Still another technology similar to the above technology is disclosed in Patent document 3. Patent document 3 discloses a method of improving the accuracy of an orthogonal modulator based on a signal that is produced when transmission data are converted in frequency by an I/Q orthogonal down converter.

Other technologies similar to the above technology is disclosed in Patent documents 4 through 9.

However, the background art described above has the following problems:

The background art described above with reference to FIGS. 1 through 6 requires a ROM for storing the waveform data of the test signals because the test signals are of a sine wave, needs to operate at an appropriate speed in order to generate smooth test signals, and requires an ND converter for converting the output of the envelope detector from an analog signal into a digital signal.

According to the background art disclosed in Patent document 1, the test signals are simplified because only two points in the I/Q orthogonal coordinate system are used as the test signals. However, Patent document 1 discloses only a method of compensating for an I/Q phase mismatch, but not a method of compensating for an I/Q amplitude mismatch. To compensate for an I/Q phase mismatch according to the method disclosed in Patent document 1, it is necessary that a DC offset as converted into an input to the orthogonal modulator, i.e., a carrier leak as converted into an output from the orthogonal modulator, be suppressed to a sufficiently low level, and an I/Q amplitude mismatch be suppressed to a sufficiently low level.

The method disclosed in Patent document 1 will be described in detail below with reference to FIGS. 7 and 8. It is assumed that two points in the first and second quadrants of an I/Q orthogonal coordinate system are used as test signals for compensating for an I/Q phase mismatch.

FIG. 7 is a diagram showing an example of test signals represented by two points used in the compensating process of an orthogonal modulator. The orthogonal modulator is assumed to be completely free of a DC offset, an I/Q phase mismatch, and an I/Q amplitude mismatch. In FIG. 7, point 5 is a point in the first quadrant, and point 6 is a point in the second quadrant.

According to the method disclosed in Patent document 1, the distance from the origin to point 5 and the distance from the origin to point 6 are determined by detecting the amplitude of the envelope of an output signal from the orthogonal modulator, and a condition for making the distances equal to each other is determined as a condition for the non-existence of an I/Q phase mismatch. If the orthogonal modulator is in an ideal state, therefore, the method disclosed in Patent document 1 obviously functions normally.

However, the orthogonal modulator necessarily suffers an input-converted DC offset because of the problem of its manufacturing accuracy.

FIG. 8 is a diagram showing an example of test signals represented by two points used in the compensating process of an orthogonal modulator if the orthogonal modulator suffers a DC offset. The orthogonal modulator is also assumed to be completely free of an I/Q phase mismatch and an I/Q amplitude mismatch.

The example shown in FIG. 8 is different from the example shown in FIG. 7 in that a positive DC offset is produced in an I component and a negative DC offset in a Q component. Even when there is no input to the orthogonal modulator, therefore, it causes a carrier leak corresponding to point 0'. Because of the DC offsets, points 5, 6 are shifted downwardly and rightwardly to respective points 5', 6'.

According to the method disclosed in Patent document 1, the distance from the origin to point 5' and the distance from the origin to point 6' are determined by detecting the amplitude of the envelope of an output signal from the orthogonal modulator, and a condition for making the distances equal to each other is determined as a condition for the non-existence of an I/Q phase mismatch.

In the example shown in FIG. 8, however, regardless of the fact that there is no I/Q phase mismatch, the distance from the origin to point 5' is apparently longer than the distance from the origin to point 6'. In other words, if the orthogonal modulator suffers a DC offset, the method disclosed in Patent document 1 does not function normally.

Even if condition for making the distance from the origin to point 5 and the distance from the origin to point 6 equal to each other is determined in the example shown in FIG. 7, it is necessary that an I/Q amplitude mismatch quantity be known in order to determine an I/Q phase mismatch quantity as an angle or its sine-wave function based on the amplitudes of I and Q components of test signals at the time. In other words, in order to know two unknown quantities, i.e., an I/Q amplitude mismatch quantity and an I/Q phase mismatch quantity, only one equation representing that the distance from the origin to point 5 and the distance from the origin to point 6 are equal to each other is not enough, but another equation is necessary. Actually, the equations disclosed in Patent document 1 do not taken into account the effect of an I/Q amplitude mismatch.

It is assumed that when two points (I,Q)=(1.05, 1.00), (−0.95, 1.00) are input as test signals to an orthogonal modulator, the signal intensities of output signals from the orthogonal modulator are equal to each other and the orthogonal modulator suffers an I/Q amplitude mismatch in which the amplitude of the I component is k times greater than the amplitude of the Q component. If an I/Q phase mismatch quantity is indicated by X, then the following equation 1 is satisfied:

$$(1.00 \cos X)^2 + (1.05k + 1.00 \sin X)^2 = (1.00 \cos X)^2 + (0.95k + 1.00 \sin X)^2 \quad \text{[Equation 1]}$$

Therefore, it will be understood that unless k is known beforehand, the I/Q phase mismatch quantity X cannot be determined.

To avoid the above problem, the DC offset and the I/Q amplitude mismatch of the orthogonal modulator may be compensated for by another method according to the background art before the method disclosed in Patent document 1 is carrier out.

In reality, however, it is necessary to use a D/A converter for compensating for a DC offset. When a D/A converter is used, a certain DC offset inevitably remains due to the resolution of the D/A converter. In addition, the amount of a carrier leak allowed by the ordinary wireless communication system, i.e., the value of a DC offset as converted into an input to the orthogonal modulator, is allowed to have a relatively large value in the range from −15 to +20 dB with respect to the total transmission power. Nevertheless, using the method disclosed in Patent document 1 requires a DC offset to be removed with much higher accuracy than the amount of the DC offset allowed by the wireless communication system, bringing about packaging complexities.

The background art disclosed in Patent document 2 is problematic in that it requires a complex system including a test signal generator for generating sine-wave test signals and an ND converter.

The background art disclosed in Patent document 3 is problematic in that it requires a complex system and, additionally, the I/Q accuracy of an I/Q orthogonal downconverter used for a compensating process is responsible for an error of the compensating process. Specifically, a highly accurate compensating process requires an I/Q orthogonal downconverter having a high I/Q accuracy. However, a compensating process is performed because an orthogonal modulator having a high modulating accuracy is not practically available, and it is contradictory to require an I/Q orthogonal downconverter having a high I/Q accuracy as a means for such a compensating process.

The background art disclosed in Patent documents 4, 5 is also problematic in that it requires a complex system including a test signal generator and an A/D converter. However, no means for solving the problems is disclosed in Patent documents 4, 5.

According to the background art disclosed in Patent document 6, four points on a phase plane where the signal intensities of output signals from an orthogonal modulator are determined to simultaneously determine quantities for compensating an I/Q phase mismatch and a DC offset. However, the background art disclosed in Patent document 6 also requires an A/D converter. It is also necessary to determine compensating quantities by solving four simultaneous equations with 12 variables shown as the equations (6) in Patent document 6, based on the data obtained within the range of the limited resolution of the A/D converter. Consequently, a piece of hardware needs to be added for solving the four simultaneous equations, and the accuracy of the compensating quantities is low. Nothing is disclosed in Patent document 6 for meeting the need for an I/Q amplitude mismatch quantity to be determined beforehand.

According to the background art disclosed in Patent document 7, a compensation quantity for compensating for an I/Q amplitude mismatch is determined from three items of information, i.e., the signal intensities of input signals to an orthogonal modulator and the signal intensity of an output signal from the orthogonal modulator. However, the background art disclosed in Patent document 7 also requires an A/D converter. No consideration is given to the effect that a DC offset and an I/Q phase mismatch have on the signal intensity of the output signal from the orthogonal modulator. Consequently, the background art disclosed in Patent document 7 operates accurately only when a DC offset and an I/Q phase mismatch are not present.

The background art disclosed in Patent documents 8, 9 is problematic in that the accuracy of an orthogonal demodulator which is used as a detecting system in an operation to compensate for an I/Q phase mismatch and an I/Q amplitude mismatch is responsible for an error of the compensating process. Specifically, a highly accurate compensating process requires an orthogonal demodulator having a high I/Q accuracy. However, a compensating process is performed because an orthogonal modulator having a high modulating accuracy is not practically available, and it is contradictory to require an orthogonal demodulator having a high I/Q accuracy as a means for such a compensating process. In an operation to compensate for an I/Q phase mismatch, if a DC offset remains in an orthogonal demodulator, then since the DC offset is reflected as an offset of a compensation quantity for correcting a transmission baseband signal, it leads to an increase a carriage leak of the orthogonal modulator. Though a means for compensating for the DC offset in the orthogonal demodulator may be provided and a compensating process may be performed on the orthogonal modulator after a compensating process is performed on the orthogonal demodulator, no means for compensating for the DC offset in the orthogonal demodulator is disclosed in Patent documents 8, 9.

As background art disclosed in Patent documents 8, 9 employs an orthogonal demodulator for a compensating process, after an output signal from the orthogonal demodulator is converted into a digital signal by an A/D converter, an I/Q mismatch quantity is determined, and a processing sequence is carried out to determine a compensation quantity for compensating for the I/Q mismatch. Inasmuch as it is necessary to determine an I/Q mismatch quantity and a compensation quantity from the data obtained within the range of the limited resolution of the ND converter, the accuracy of the compensation quantity is lowered. Patent documents 8, 9 fail to disclose a method of solving such a problem.

Patent document 1: JP-A No. 2002-252663;
Patent document 2: JR-A No. 08-213846;
Patent document 3: PC(WO) No. 09-504673;
Patent document 4: JP-A No. 2004-007083;
Patent document 5: PC(WO) No. 2004-509555;

Patent document 6: International publication No. 2003/101061 pamphlet;
Patent document 7: JP-A No. 06-350658;
Patent document 8: JP-A No. 2004-274288; and
Patent document 9: JP-A No. 2004-363757.

DISCLOSURE OF THE INVENTION

It is an object of the present invention to provide a signal processing circuit which is not of a complex arrangement and which is capable of compensating for an I/Q mismatch of an orthogonal modulator while reducing the effect of a remaining DC offset.

To achieve the above object, there is provided in accordance with the present invention a signal processing circuit for compensating for an I/Q mismatch including an I/Q amplitude mismatch representative of a discrepancy between the amplitudes of I/O components of an output signal from an orthogonal modulator and an I/Q phase mismatch representative of a deviation from 90 degrees of the phase difference between the I/O components of the output signal from the orthogonal modulator, comprising test signal generating means for successively generating test signals represented by four points, which comprise two sets of two points positioned in point symmetry with respect to the origin of an I/Q orthogonal coordinate system, and outputting the test signals to a baseband port of the orthogonal modulator, detecting means for detecting and outputting the amplitude of an envelope of the output signal from the orthogonal modulator when the test signals represented by four points are generated, calculating means for calculating and outputting an average value of output signals from the detector when the test signals represented by the two points of each set are generated, and control means for adjusting the amplitudes and/or phases of the test signals so that the average values produced when the test signals represented by the two sets of the two points are generated are equal to each other.

With the above arrangement, since test signals represented by four points, which comprise two sets of two points positioned in point symmetry with respect to the origin, are generated, and an I/Q mismatch quantity is calculated using the average value of the amplitude of the envelope of the amplitude of the output signal from the orthogonal modulator at the time the test signals represented by the two points of each set are generated, the effect of a remaining DC offset is removed.

Furthermore, inasmuch as test signals represented by four points, which comprise two sets of two points positioned in point symmetry with respect to the origin, are used, the test signals may be simplified as being of a rectangular wave. Accordingly, no means for generating sine-wave test signals may be required, and a memory area for storing the test signals may be small. As a result, the arrangement of the signal processing circuit is prevented from being complex.

BEST MODE FOR CARRYING OUT THE INVENTION

Figure 1:
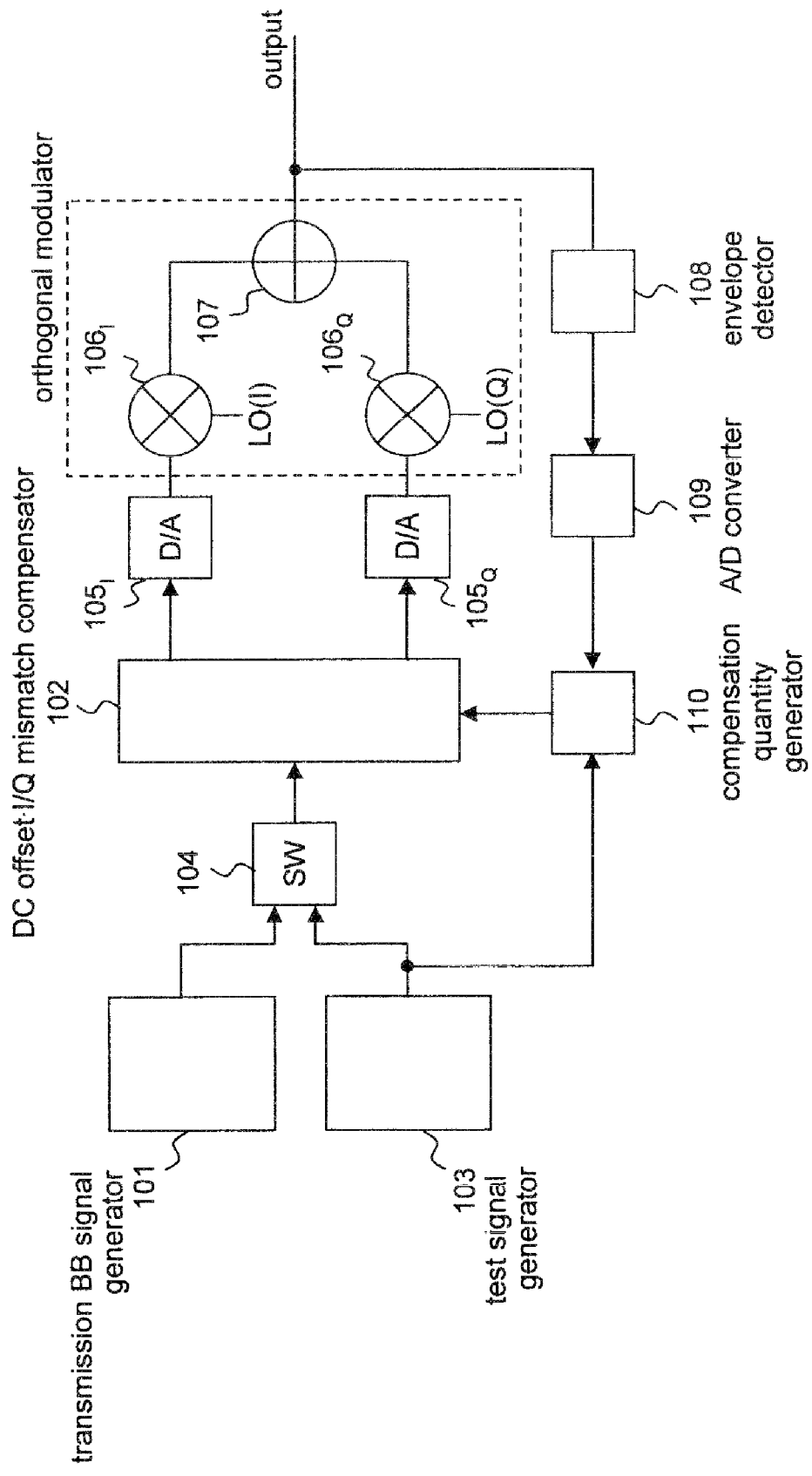
FIG. 1 is a block diagram showing an example of the overall arrangement of a signal processing circuit according to the background art.
Figure 2:
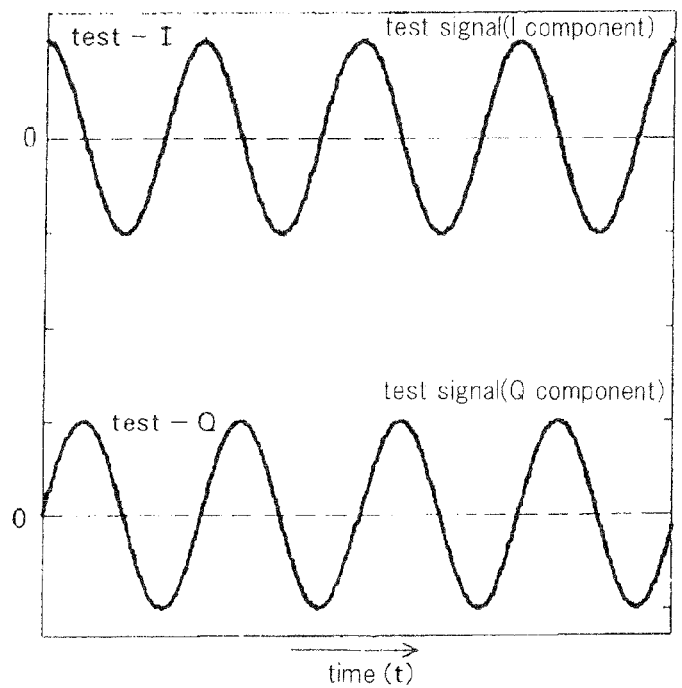
FIG. 2 is a diagram showing typical test signals used to perform compensation on an orthogonal modulator according to the background art.
Figure 3:
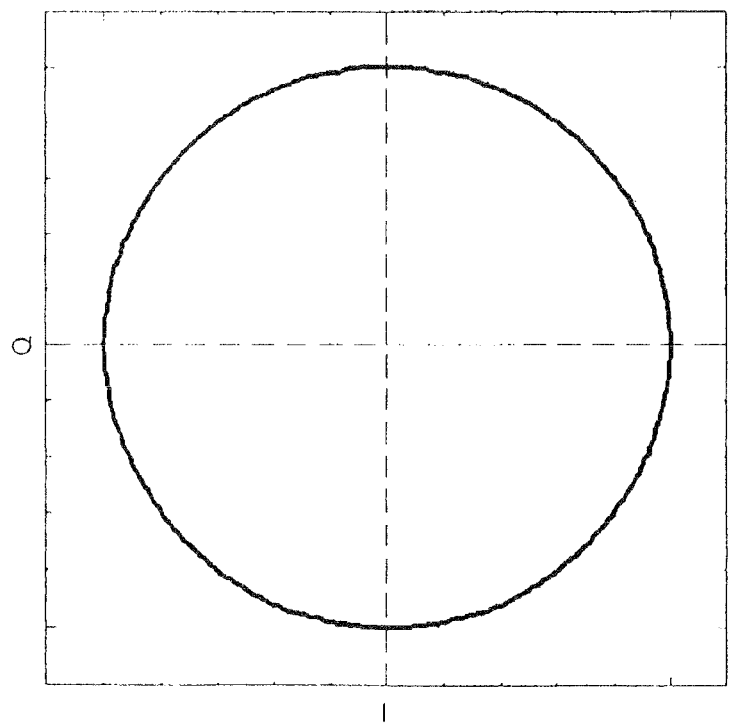
FIG. 3 is a diagram showing the constellation of an output signal from the orthogonal modulator in an ideal state.
Figure 4:
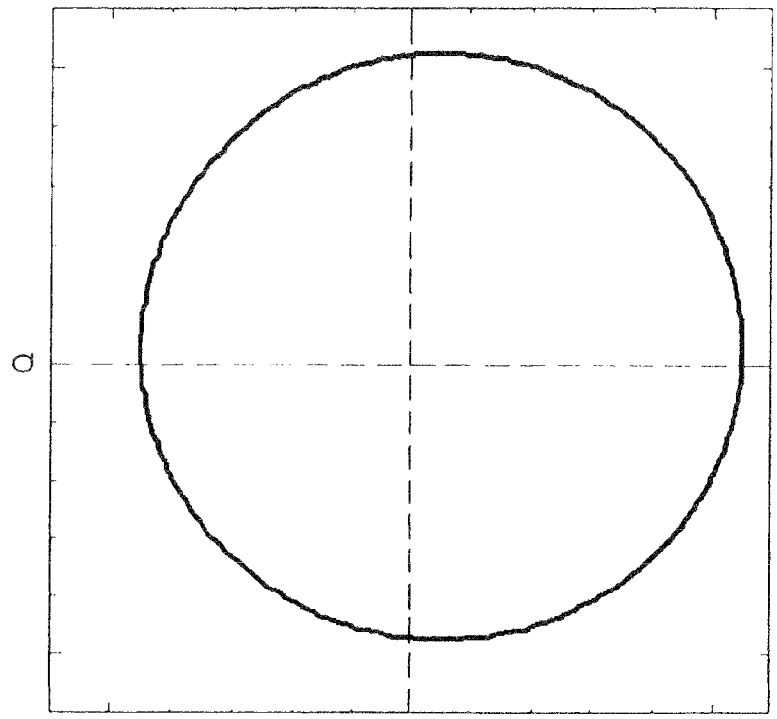
FIG. 4 is a diagram showing the constellation of an output signal from the orthogonal modulator which suffers a DC offset.
Figure 5:
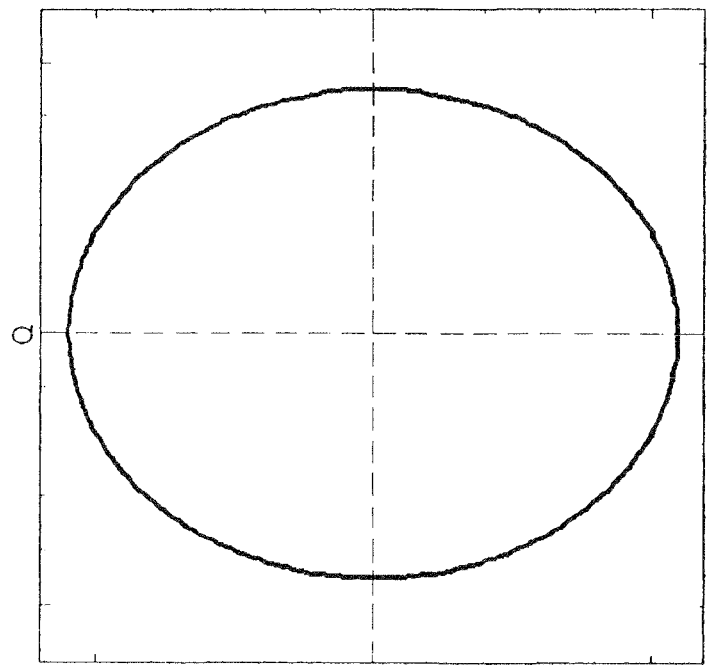
FIG. 5 is a diagram showing the constellation of an output signal from the orthogonal modulator which suffers an I/Q amplitude mismatch.
Figure 6:
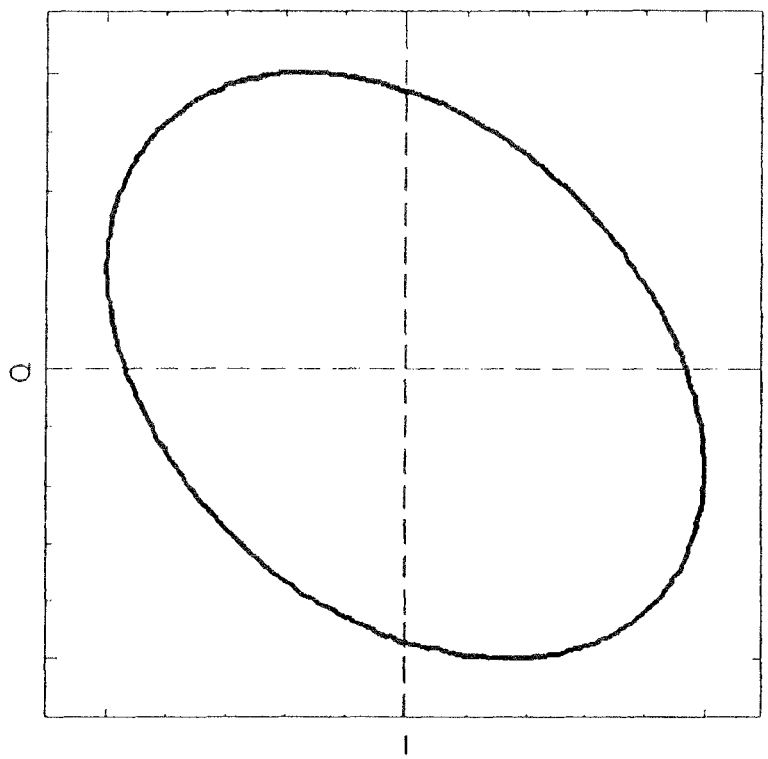
FIG. 6 is a diagram showing the constellation of an output signal from the orthogonal modulator which suffers an I/Q phase mismatch.
Figure 7:
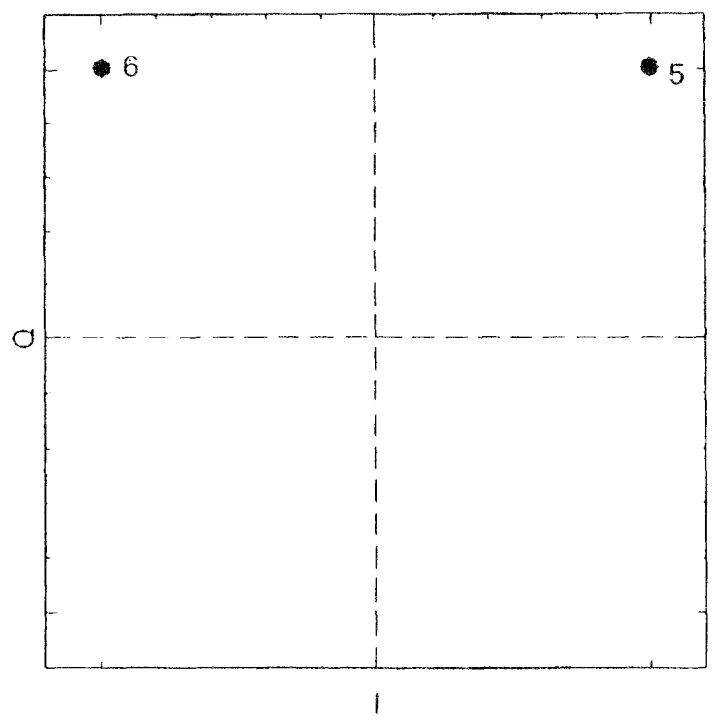
FIG. 7 is a diagram showing an example of test signals represented by two points used by a method disclosed in Patent document 1.
Figure 8:
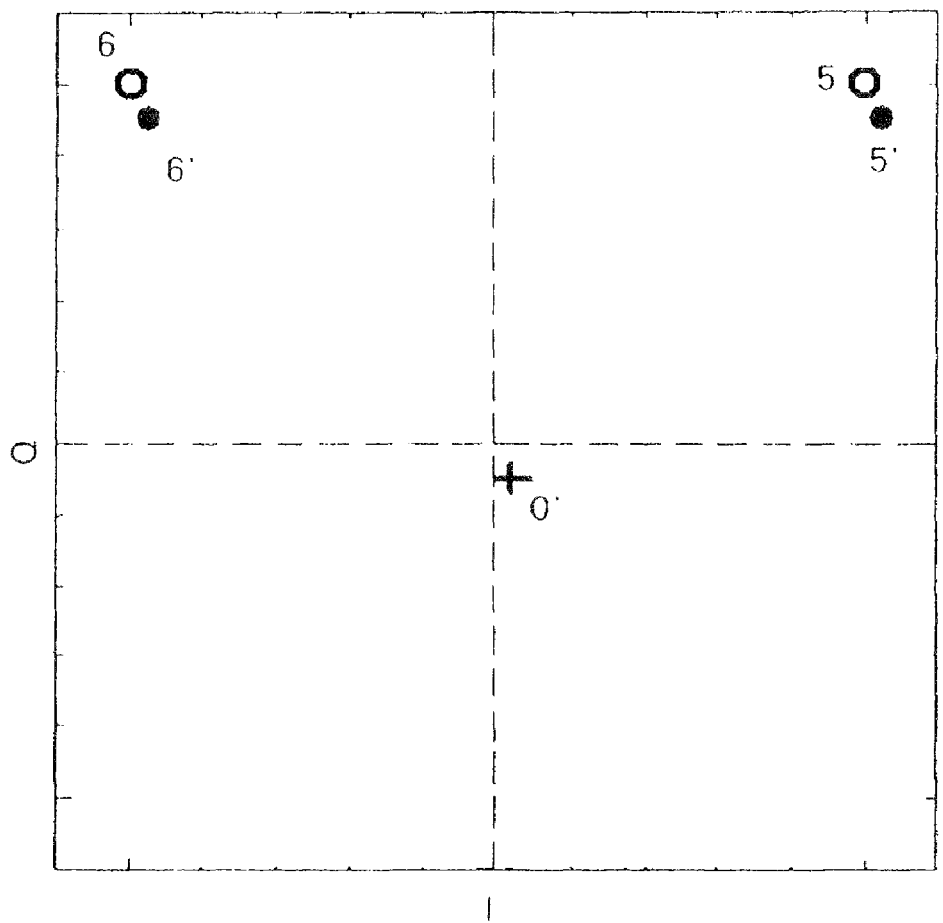
FIG. 8 is a diagram showing the manner in which the test signals represented by two points used by the method disclosed in Patent document 1 is shifted by a DC offset.

The best mode for carrying out the present invention will be described below with reference to the drawings. The present invention has a primary object to compensate for an I/Q mismatch of an orthogonal modulator, and it is assumed that any background art (e.g., the means disclosed in JP-A No. 5-14429 or JP-A No. 7-58791) is used as a means for compensating for an DC offset of the orthogonal modulator. In the drawings to be described below, the means for compensating for an DC offset of the orthogonal modulator is omitted from illustration.

1st Exemplary Embodiment

Figure 9:
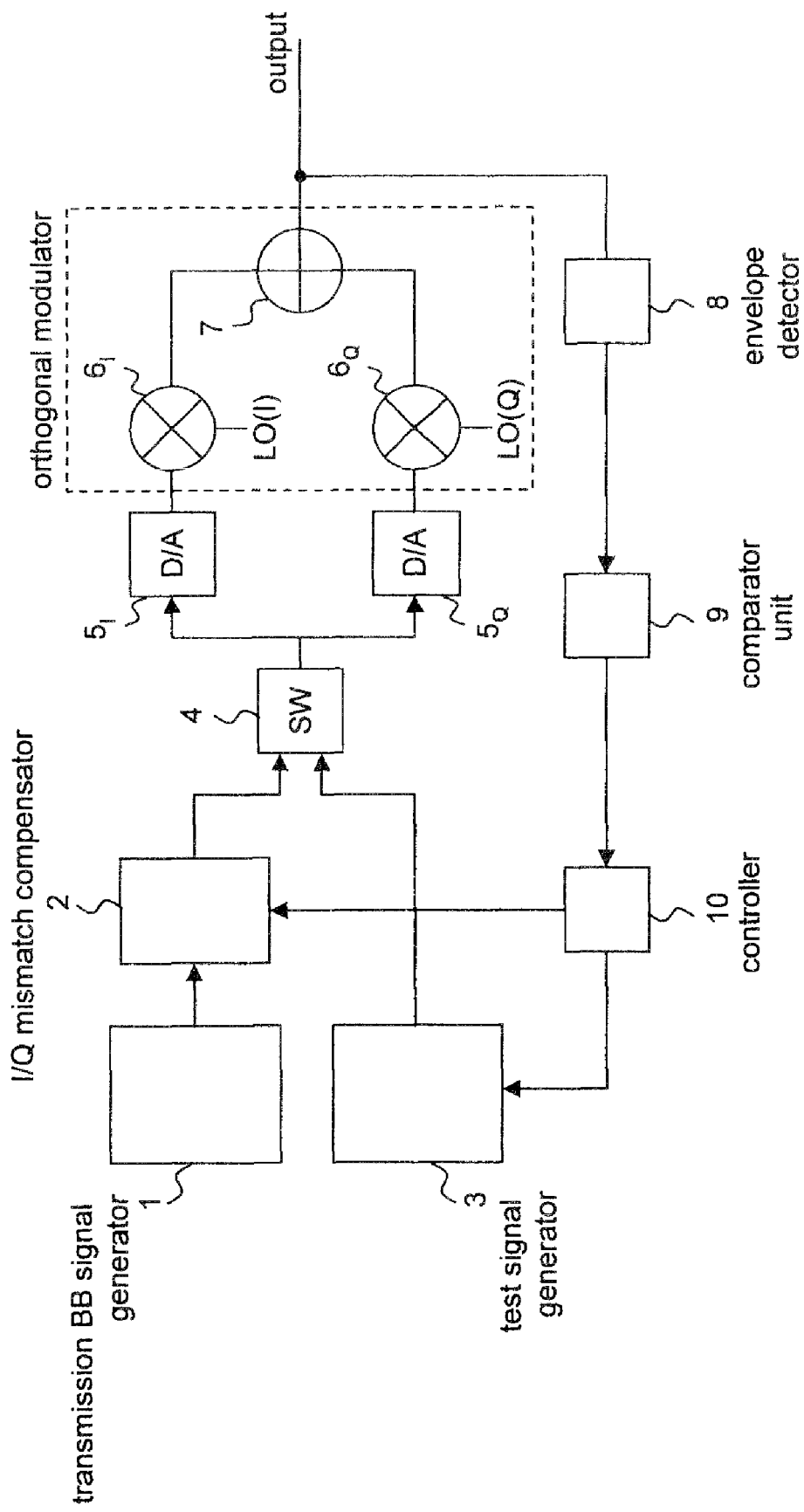
FIG. 9 is a block diagram showing the overall arrangement of a signal processing circuit according to a first exemplary embodiment of the present invention.

FIG. 9 is a block diagram showing the overall arrangement of a signal processing circuit according to a first exemplary embodiment of the present invention.

As shown in FIG. 9, the signal processing circuit according to the present exemplary embodiment comprises transmission BB (BaseBand) signal generator 1, I/Q mismatch compensator 2, test signal generator 3, switch 4, D/A converters $5_I$, $5_Q$, mixers $6_I$, $6_Q$, adder 7, envelope detector 8, comparator unit 9, and controller 10.

Transmission BB signal generator 1 generates a transmission baseband signal in a transmitting process.

In a compensating process, a compensation quantity for compensating for an I/Q mismatch of an orthogonal modulator is set in I/Q mismatch compensator 2 by controller 10. In the transmitting process, I/Q mismatch compensator 2 corrects the transmission baseband signal generated by transmission BB signal generator 1 based on the compensation quantity set by controller 10.

In the compensating process, test signal generator 3 generates test signals represented by four points, which comprise two sets of two points positioned in point symmetry with respect to the origin of an I/Q orthogonal coordinate system, under the control of controller 10.

Specifically, in a mode of compensating for an I/Q amplitude mismatch, test signal generator 3 generates test signals represented by four points, which comprise two sets of points, i.e., a set of a point in which only an I component is positive and a point in which only an I component is negative and a set of a point in which only a Q component is positive and a point in which only a Q component is negative.

In a mode of compensating for an I/Q phase mismatch, test signal generator 3 generates test signals represented by four points, which comprise two sets of points, i.e., a set of a point which is located in the first quadrant and a point which is located in the third quadrant and a set of a point which is located in the second quadrant and a point which is located in the fourth quadrant.

Switch 4 selects the test signals generated by test signal generator 3 in the compensating process, and selects the signal corrected by I/Q mismatch compensator 2 in the transmitting process.

D/A converter $5_I$ converts the I component of a signal selected by switch 4 from a digital signal into an analog signal. D/A converter $5_Q$ converts the Q component of the signal selected by switch 4 from a digital signal into an analog signal.

Mixer $6_I$ upconverts the I component of the signal converted by D/A converter $5_I$ by mixing it with the I component of a local signal. Mixer $6_Q$ upconverts the Q component of the signal converted by D/A converter $5_Q$ by mixing it with the Q component of the local signal.

Adder 7 adds the I component of the signal mixed by mixer $6_I$ and the Q component of the signal mixed by mixer $6_Q$ to each other. The signal that has thus been orthogonally modulated serves as an output signal of the signal processing circuit.

Envelope detector 8 detects the amplitude of the envelope of the output signal from the orthogonal modulator.

Comparator unit 9 calculates the average value of outputs from envelope detector 8 for the test signals as the two points of each set, and compares the average values of the respective sets.

Specifically, in the mode of compensating for an I/Q amplitude mismatch, comparator unit 9 calculates the average value of outputs from envelope detector 8 at the time test signals whose only I components are positive and negative are generated and the average value of outputs from envelope detector 8 at the time test signals whose only Q components are positive and negative are generated, and compares the calculated average values with each other.

In the mode of compensating for an I/Q phase mismatch, comparator unit 9 calculates the average value of outputs from envelope detector 8 at the time test signals in the first and third quadrants are generated and the average value of outputs from envelope detector 8 at the time test signals in the second and fourth quadrants are generated, and compares the calculated average values with each other.

In the compensating process, controller 10 controls test signal generator 3 to generate the test signals represented by four points described above, calculates an I/Q mismatch quantity of the orthogonal modulator based on the comparison results from comparator unit 9, generates a compensation quantity for compensating for an I/Q mismatch, and sets the compensation quantity in I/Q mismatch compensator 2.

Specifically, in the mode of compensating for an I/Q amplitude mismatch, controller 10 repeats a process of updating the amplitudes of the I components of the test signals, for a predetermined number of times so that the average value of outputs from envelope detector 8 at the time test signals whose only I components are positive and negative are generated and the average value of outputs from envelope detector 8 at the time test signals whose only Q components are positive and negative are generated are equal to each other. Controller 10 calculates an I/Q amplitude compensation quantity from the ratio of the amplitudes of the I components of the test signals and the amplitudes of the Q components thereof which have finally been obtained.

In the mode of compensating for an I/Q phase mismatch, controller 10 repeats a process of updating the amplitudes of the I components of the test signals in the first and third quadrants and the amplitudes of the I components of the test signals in the second and fourth quadrants, for a predetermined number of times so that the average value of outputs from envelope detector 8 at the time test signals in the first and third quadrants are generated and the average value of outputs from envelope detector 8 at the time test signals in the second and fourth quadrants are generated are equal to each other. Controller 10 calculates an I/Q phase compensation quantity from the ratio of the amplitudes of the I components of the test signals in the first and third quadrants and the amplitudes of the I components of the test signals in the second and fourth quadrants which have finally been obtained.

Arrangement details of comparator unit 9 and I/Q mismatch compensator 2 shown in FIG. 9 will be described in detail below.

Figure 10:
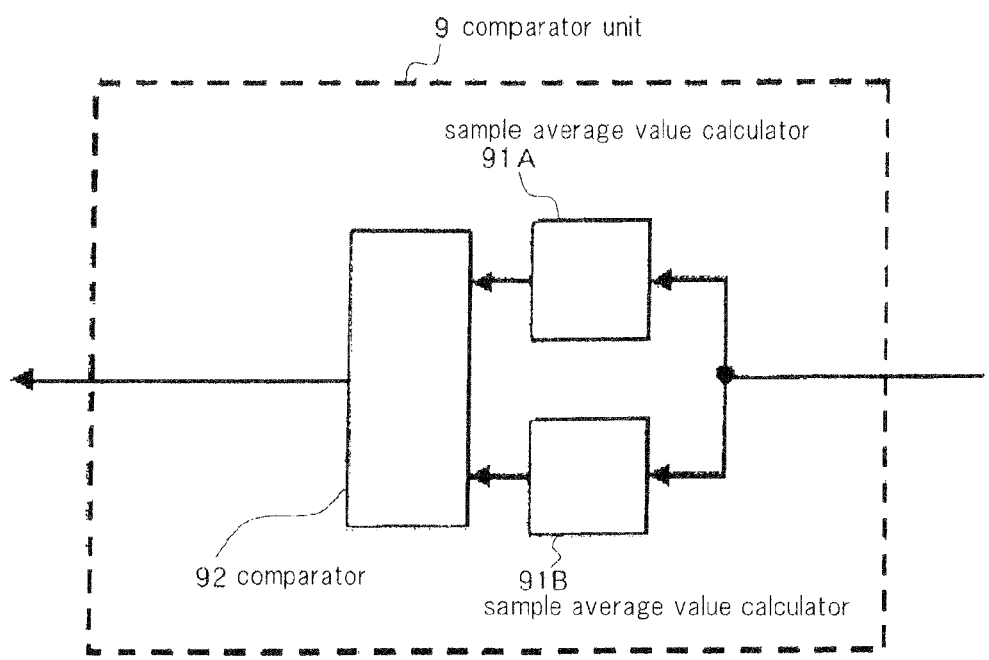
FIG. 10 is a block diagram showing the arrangement of a comparing unit shown in FIG. 9.

FIG. 10 is a block diagram showing the arrangement of comparator unit 9 shown in FIG. 9.

As shown in FIG. 10, comparator unit 9 comprises sample average value calculators 91A, 91B and comparator 92.

Sample average value calculator 91A stores outputs from envelope detector 8 and calculates and outputs the average value thereof while test signals represented by one set of two points are being generated.

Sample average value calculator 91B stores outputs from envelope detector 8 and calculates and outputs the average value thereof while test signals represented by the other set of two points are being generated.

Comparator 92 compares the magnitudes of outputs from sample average value calculators 91A, 91B, and outputs the comparison result to controller 10.

Figure 11:
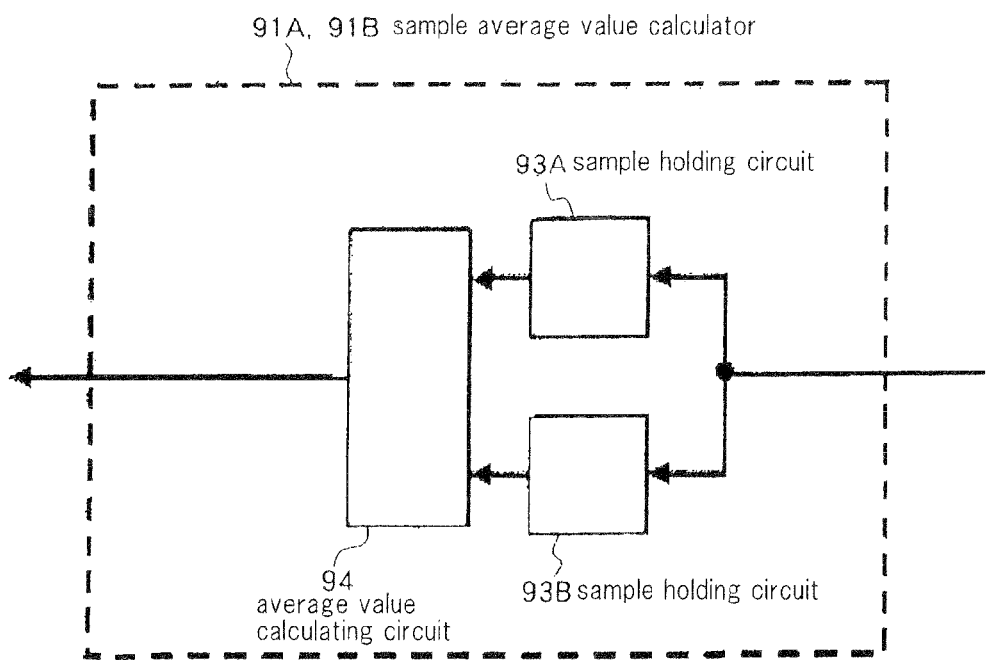
FIG. 11 is a block diagram showing the arrangement of sample average value calculators shown in FIG. 10.

FIG. 11 is a block diagram showing the arrangement of sample average value calculators 91A, 91B shown in FIG. 10.

As shown in FIG. 11, sample average value calculators 91A, 91B comprise sample holding circuits 93A, 93B and average value calculating circuit 94.

Sample holding circuit 93A stores the output from envelope detector 8 while one of the test signals of the same set is being generated. Sample holding circuit 93B stores the output from envelope detector 8 while the other of the test signals of the same set is being generated.

Average value calculating circuit 94 calculates the average value of the values stored in sample holding circuits 93A, 93B, and outputs the average value to controller 10.

Figure 12:
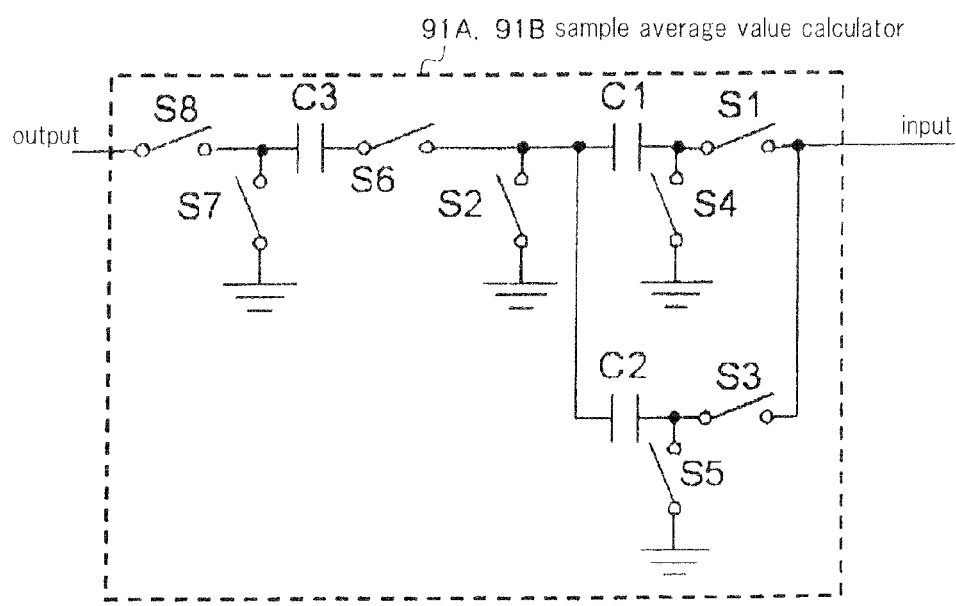
FIG. 12 is a circuit diagram of the arrangement of the sample average value calculators shown in FIG. 10.

FIG. 12 is a circuit diagram of the arrangement of sample average value calculators 91A, 91B shown in FIG. 10.

As shown in FIG. 12, sample average value calculators 91A, 91B comprise capacitors C1 through C3 and switches S1 through S8. It is assumed that capacitors C1, C2 have the same capacitance value.

In an initial state, switches S1, S3 are turned off and all the other switches are turned on. Therefore, capacitors C1 through C3 are discharged.

Then, switch S4 is turned off and then switch S1 is turned on. At this time, an input voltage (voltage information 1: a voltage corresponding to the output from envelope detector 8 while one of the test signals of the same set is being generated) is stored as an electric charge in capacitor C1.

Then, switch S1 is turned off, and capacitor C1 holds the electric charge.

Then, switch S5 is turned off and then switch S3 is turned on. At this time, an input voltage (voltage information 2: a voltage corresponding to the output from envelope detector 8 while the other of the test signals of the same set is being generated) is stored as an electric charge in capacitor C2.

Then, switch S3 is turned off, and capacitor C2 holds the electric charge.

Then, switches S6, S2 are turned on. The node that includes capacitors C2, C1 shown in right side of Figure is separated from the node shown in left side of Figure.

Then, switches S4, S5 are turned on. The average value of the electric charges in capacitors C1, C2 is stored in capacitors C1, C2. In other words, the average value of voltage information 1 and voltage information 2 is obtained.

Then, switch S6 is turned on, transferring the electric charge corresponding to the above average value to capacitor C2.

Switch S7 is turned on, then switch S2 is turned on, and finally switch S8 is turned on. Therefore, an output voltage proportional to the average value of voltage information 1 and voltage information 2 is output.

Figure 13:
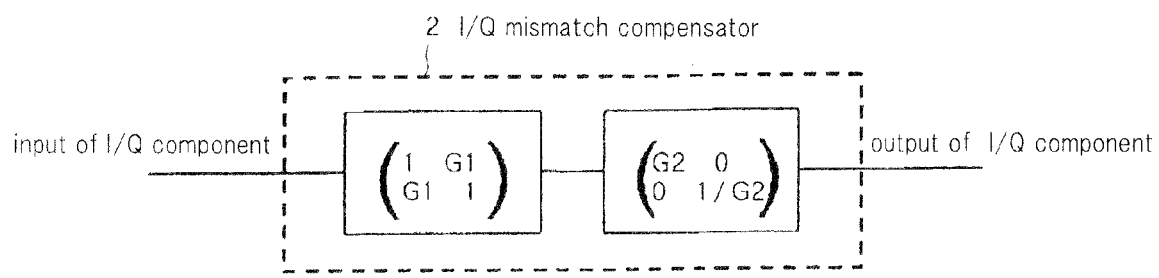
FIG. 13 is a diagram showing the arrangement of a corrector shown in FIG. 9.

FIG. 13 is a diagram showing the arrangement of I/Q mismatch compensator 2 shown in FIG. 9.

As shown in FIG. 13, I/Q mismatch compensator 2 performs two matrix operations in cascade on the I/Q components of the transmission baseband signal.

G1 represents a parameter indicative of an I/Q phase compensation quantity for compensating for an I/Q phase mismatch, and G2 represents a parameter indicative of an I/Q amplitude compensation quantity for compensating for an I/Q amplitude mismatch. In the transmitting process, since the transmission baseband signal generated by the transmission BB signal generator has its I component corrected into G2I+G1G2Q, and its Q component corrected into (G1/G2)I+(1/G2)Q, the I/Q mismatch of the orthogonal modulator is compensated for.

Controller 10 calculates I/Q amplitude compensation quantity G2 based on the ratio of the amplitudes of the I components of the test signals and the amplitudes of the Q components thereof which have finally been obtained, as described above.

In greater detail, if the amplitudes of the test signals which have finally been obtained are such that the amplitudes of the I components: the amplitudes of the Q components=G2:1/G2, then controller 10 selects G2 such that the amplitudes of the I components of the test signals: the amplitudes of the Q components thereof=1/G2: G2. In this manner, an I/Q amplitude mismatch can be compensated for.

Controller 10 calculates I/Q phase compensation quantity G1 based on the ratio of the amplitudes of the I components at the time the test signals in the first and third quadrants are generated and the amplitudes of the I components of the test signals in the second and fourth quadrants are generated, as described above.

A process of calculating G1 will be described in detail below.

Of two matrixes shown in FIG. 13, the left matrix containing G1 will be considered.

If signals I=x, Q=1 are input, the magnitude of the output of the left matrix is determined by the following equation 2:

$$\sqrt{(x+G1)^2 + (G1x+1)^2} \qquad \text{[Equation 2]}$$

If signals I=−1/x, Q=1 are input, the magnitude of the output of the left matrix is determined by the following equation 2:

$$\sqrt{(-1/x+G1)^2+(-G1x+1)^2} \quad \text{[Equation 3]}$$

A condition for keeping the magnitudes of the two outputs represented by the equations 2, 3 in equilibrium is determined by the following equation 4:

$$\sqrt{(x+G1)^2+(G1x+1)^2} = \sqrt{(-1/x+G1)^2+(-G1/x+1)^2} \quad \text{[Equation 4]}$$

The equation 4 is modified into the following equation 5:

$$(G1^2+1)(x-1/x)+4G1=0 \quad \text{[Equation 5]}$$

In the mode of compensating for an I/Q phase mismatch, controller 10 determines the ratio of the amplitudes of the I components at the time the test signals in the first and third quadrants are generated and the amplitudes of the I components of the test signals in the second and fourth quadrants are generated. The ratio is indicated by $x^2$, and G1 at the time may be determined by the equation 5.

Several methods may be available for determining a solution to the equation 5. Here, the determination of an approximate solution according to a method based on simple hardware packaging will be described below.

Generally, the I/Q phase mismatch quantity of an orthogonal modulator is not unduly great. In other words, x referred to above is close to 1, and G1 to 0.

To express the foregoing, x is represented by x=1+d and put into the equation 5, and the following equation 6 is obtained:

$$(G1^2+1)\{(1+d)-1/(1+d)\}+4G1=0 \quad \text{[Equation 6]}$$

If it is assumed that d and G1 are sufficiently smaller than 1 in the equation 6 and higher-order terms of d, G1 are omitted from the equation 6, then the following equation 7 is obtained:

$$G1=d/2=(x-1)/2 \quad \text{[Equation 7]}$$

Figure 14:
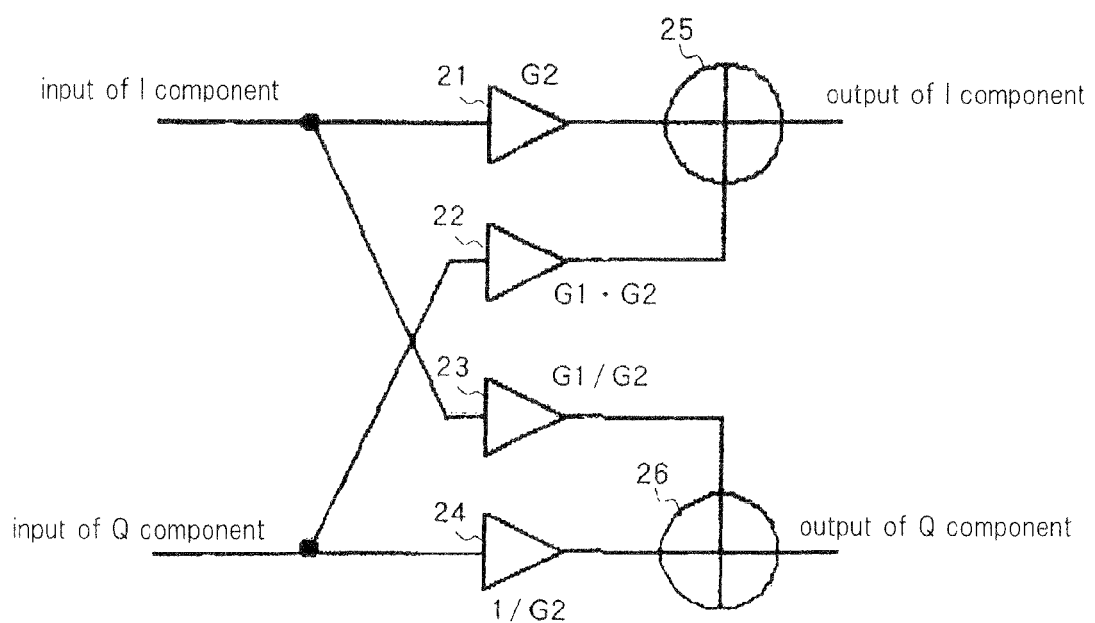
FIG. 14 is a diagram showing amplifiers and adders which represent the arrangement of the corrector shown in FIG. 13.

FIG. 14 is a diagram showing amplifiers and adders which represent the arrangement of I/Q mismatch compensator 2 shown in FIG. 13.

As shown in FIG. 14, I/Q mismatch compensator 2 shown in FIG. 13 comprises amplifier 21 for amplifying the I component of an input signal with amplification factor G2, amplifier 22 for amplifying the Q component of the input signal with amplification factor G1·G2, amplifier 23 for amplifying the I component of the input signal with amplification factor G1/G2, amplifier 24 for amplifying the Q component of the input signal with amplification factor 1/G2, adder 25 for adding outputs from amplifiers 21, 22, and adder 26 for adding outputs from amplifiers 23, 24.

Operation of the signal processing circuit according to the present exemplary embodiment will be described below.

Figure 15:
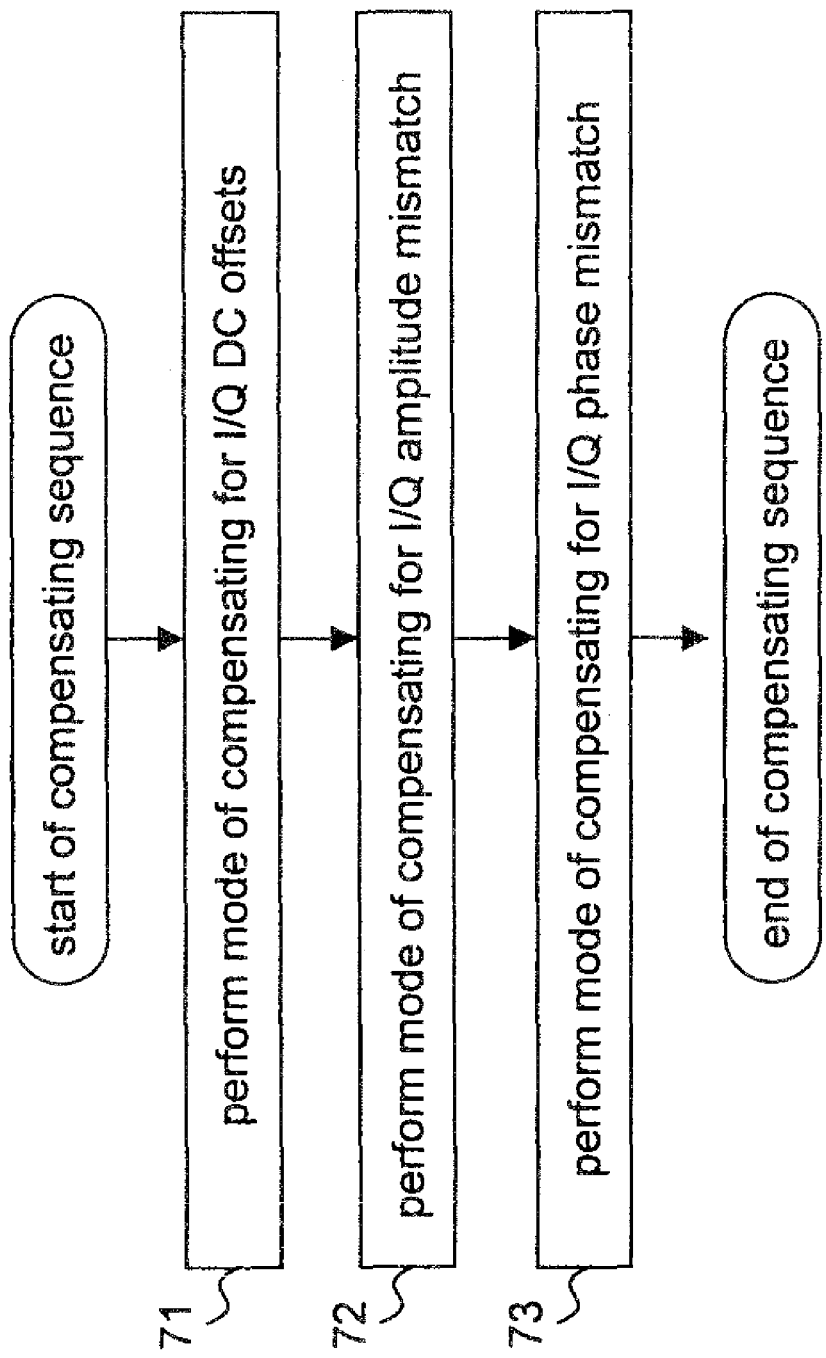
FIG. 15 is a flowchart illustrative of a compensating sequence of the signal processing circuit shown in FIG. 9.

FIG. 15 is a flowchart illustrative of a compensating sequence of the signal processing circuit shown in FIG. 9.

As shown in FIG. 15, the signal processing circuit according to the present exemplary embodiment compensates for respective DC offsets of the I and Q components (step 71), then compensates for an I/Q amplitude mismatch (step 72), and finally compensates for an I/Q phase mismatch (step 73).

The mode of compensating for DC offsets is carried out by a means, not shown in FIG. 9, which is the same as with the background art, and does not belong to the essential features of the present invention. Therefore, the mode of compensating for DC offsets will not be described below, and only the mode of compensating for an I/Q amplitude mismatch and the mode of compensating for an I/Q phase mismatch will be described below.

Figure 16:
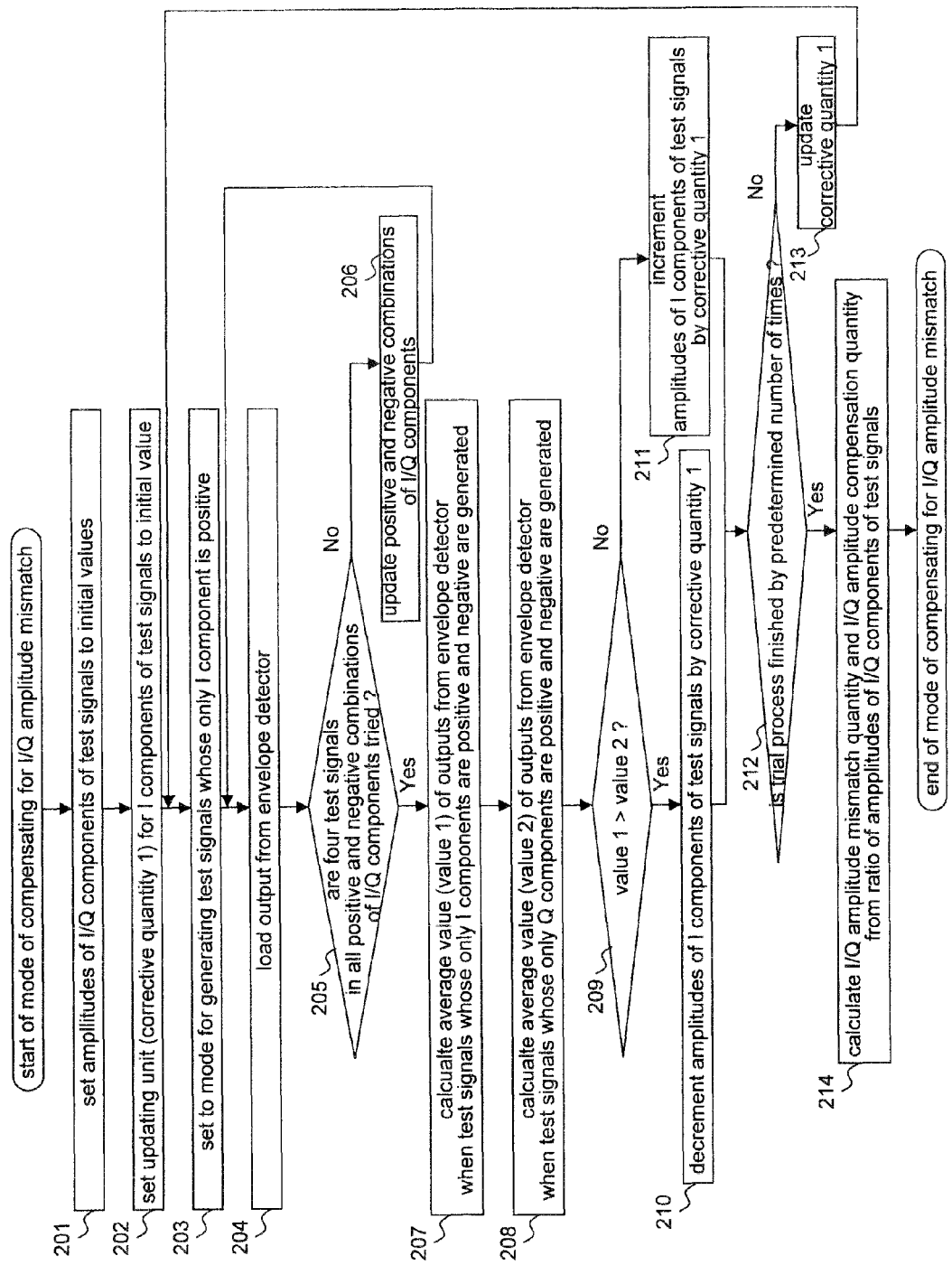
FIG. 16 is a flowchart illustrative of a mode of compensating for an I/Q amplitude mismatch in the signal processing circuit shown in FIG. 9.

FIG. 16 is a flowchart illustrative of the mode of compensating for an I/Q amplitude mismatch in the signal processing circuit shown in FIG. 9.

As shown in FIG. 16, controller 10 sets the amplitudes of I and Q components of test signals to initial values (step 201). Specifically, controller 10 selects the same initial value for the amplitudes of the I components and the amplitudes of the Q components.

Then, controller 10 sets an updating unit (hereinafter referred to as corrective quantity 1) for updating the amplitudes of the I components of the test signals to initial values (step 202).

Then, controller 10 sets itself to a mode for causing test signal generator 3 to generate as test signals points where only the I component is positive and the Q component is 0 (step 203). While this mode is being maintained, D/A converter $5_I$ outputs a DC signal proportional to the test signal. The DC signal is mixed with the I component of a local signal by mixer $6_I$. Therefore, the orthogonal modulator produces an output signal having a constant amplitude. The amplitude of the output signal is detected by envelope detector 8. Since envelope detector 8 generally has square characteristics, the output from envelope detector 8 is a signal proportional to the square of the amplitude of the output signal from the orthogonal modulator.

Then, comparator 9 loads the output from envelope detector 8 (step 204).

Subsequently, controller 10 repeats a process of updating positive and negative combinations of the I/Q components of test signals (step 206) with respect to all four points including a point where only the I component is positive and the Q component is 0, a point where only the I component is negative and the Q component is 0, a point where only the Q component is positive and the I component is 0, and a point where only the Q component is negative and the I component is 0, until the trial process of loading the output from envelope detector 8 into comparator 9 is finished (step 205), and also repeats steps 203, 204.

When the process of loading the output from envelope detector 8 into comparator 9 at the time the test signals represented by the four points are generated is finished, comparator 9 calculates the average value (referred to as value 1) of the output from envelope detector 8 at the time a test signal whose only I component is positive is generated and the output from envelope detector 8 at the time a test signal whose only I component is negative is generated (step 207).

Then, comparator 9 calculates the average value (referred to as value 2) of the output from envelope detector 8 at the time a test signal whose only Q component is positive is generated and the output from envelope detector 8 at the time a test signal whose only Q component is negative is generated (step 208).

Then, comparator 9 compares the magnitudes of values 1, 2, and transfers the comparison result to controller 10 (step 209).

Then, based on the comparison result from step 209, controller 10 updates the amplitudes of the I components of the test signals so that value 1 and value 2 are equal to each other. Specifically, if value 1 is greater in step 209, then controller 10 decrements the amplitudes of the I components of the test signals by corrective quantity 1 (step 210). If value 2 is greater in step 209, then controller 10 increments the amplitudes of the I components of the test signals by corrective quantity 1 (step 211).

Subsequently, controller 10 repeats the process of updating corrective quantity 1 (step 213) and the process from step 203 to steps 210, 211 until the trial process from step 203 to steps 210, 211 is finished a predetermined number of times (step 212)

If the trial process is finished a predetermined number of times, then controller 10 calculates an I/Q amplitude mismatch quantity of the orthogonal modulator based on the ratio of the final amplitudes of the I components of the test signals and the amplitudes of the Q components of the test signals, and calculates an I/Q amplitude compensation quantity to be set in I/Q mismatch compensator 2 based on the calculated I/Q amplitude mismatch quantity (step 214). Specifically, in the transmitting process, controller 10 sets an I/Q amplitude compensation quantity in I/Q mismatch compensator 2 so that the amplitude of the I component of the transmission baseband signal with respect to the amplitude of the Q component is equal to "the amplitudes of the I components of the test signals/the amplitudes of the Q components of the test signals".

The mode of compensating for an I/Q amplitude mismatch is now ended.

Figure 17:
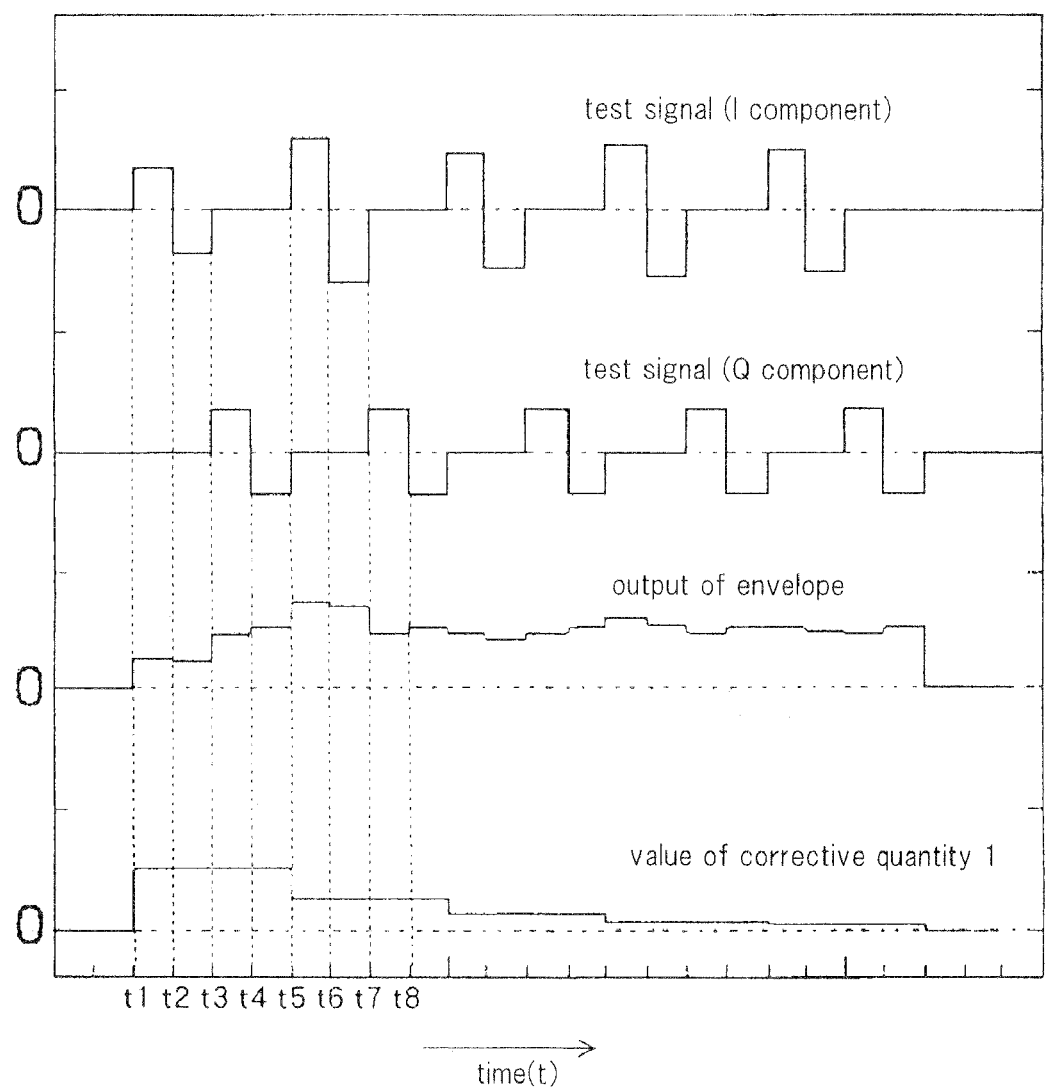
FIG. 17 is a timing chart illustrative of the mode of compensating for an I/Q amplitude mismatch in the signal processing circuit shown in FIG. 9.

FIG. 17 is a timing chart illustrative of the mode of compensating for an I/Q amplitude mismatch in the signal processing circuit shown in FIG. 9, and shows a time sequence of changes in internal signals. The initial values of the amplitudes of the I and Q components of the test signals are set to the same value.

As shown in FIG. 17, at times t1 through t4, test signal generator 3 successively outputs a test signal whose only I component is positive, a test signal whose only I component is negative, a test signal whose only Q component is positive, and a test signal whose only Q component is negative.

At this time, the average value of outputs from envelope detector 8 when test signals whose only I components are positive and negative are generated is smaller than the average value of outputs from envelope detector 8 when test signals whose only Q components are positive and negative are generated.

Therefore, controller 10 increments the amplitudes of the I components of the test signals by corrective quantity 1, and then updates the value of corrective quantity 1 into a smaller value.

Then, at times t5 through t8, test signal generator 3 outputs again test signals represented by four points. The amplitudes of the I components of the test signals have been incremented by the initial value of corrective quantity 1.

At this time, the average value of outputs from envelope detector 8 when test signals whose only I components are positive and negative are generated is greater than the average value of outputs from envelope detector 8 when test signals whose only Q components are positive and negative are generated.

Therefore, controller 10 decrements the amplitudes of the I components of the test signals by corrective quantity 1, and then updates the value of corrective quantity 1 into a smaller value.

Controller 10 repeats the operation from the outputting of the test signals until the updating of the value of corrective quantity 1, by a predetermined number of times (five times in FIG. 17).

During this time, since controller 10 progressively reduces the value of corrective quantity 1, the difference between the average values progressively approaches 0. Consequently, controller 10 calculates an I/Q amplitude mismatch quantity of the orthogonal modulator based on the ratio of the final amplitudes of the I components of the test signals and the amplitudes of the Q components of the test signals, and calculates an I/Q amplitude compensation quantity to be set in I/Q mismatch compensator 2 based on the calculated I/Q amplitude mismatch quantity.

Figure 18:
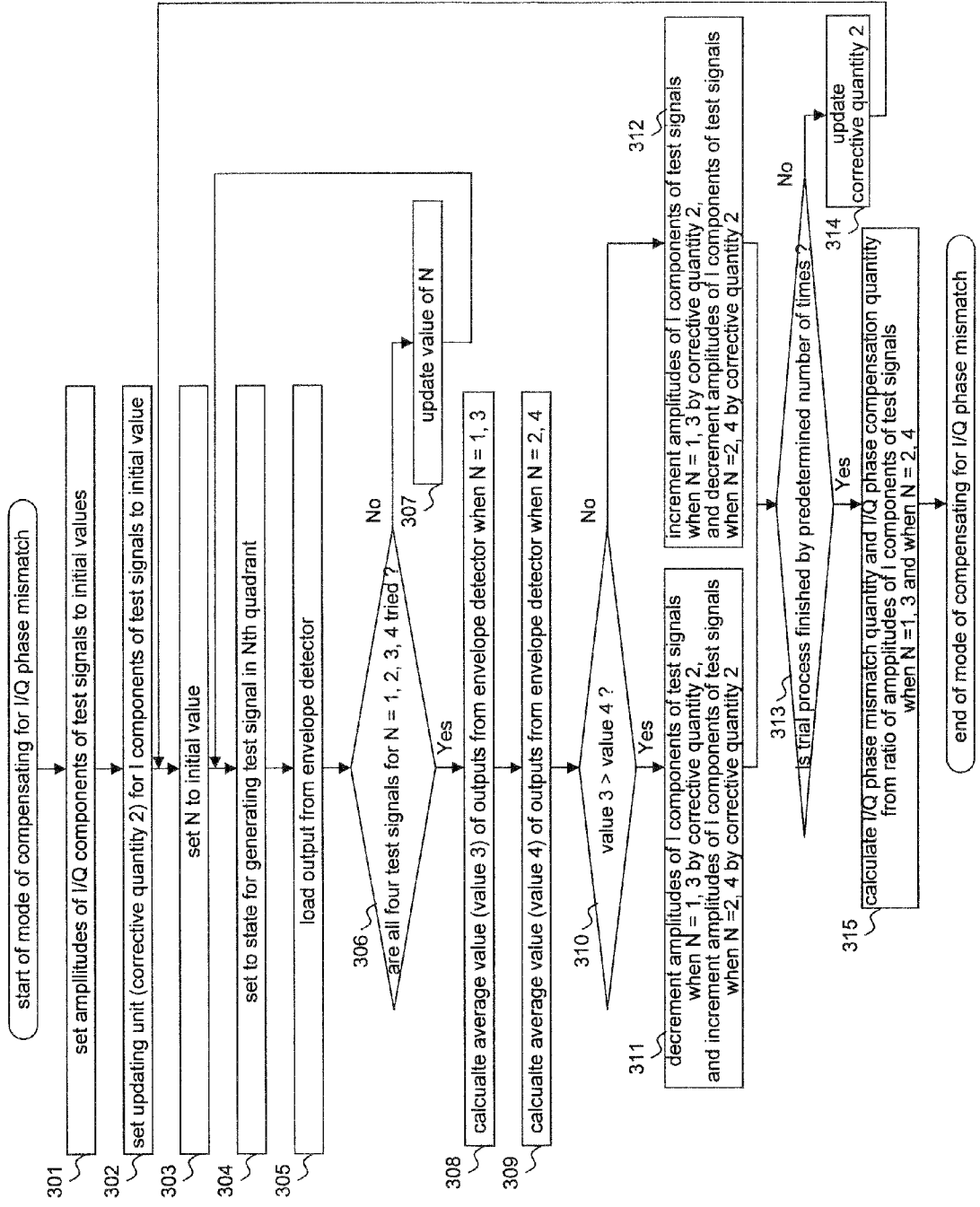
FIG. 18 is a flowchart illustrative of a mode of compensating for an I/Q phase mismatch in the signal processing circuit shown in FIG. 9.

FIG. 18 is a flowchart illustrative of a mode of compensating for an I/Q phase mismatch in the signal processing circuit shown in FIG. 9.

As shown in FIG. 18, controller 10 sets the amplitudes of test signals to initial values (step 301). Specifically, controller 10 selects initial values for the ratio of the amplitudes of the I components and the amplitudes of the Q components in order to cancel out the I/Q amplitude mismatch, based on the result of the above compensation for the I/Q amplitude mismatch.

Then, controller 10 sets an updating unit (hereinafter referred to as corrective quantity 2) for updating the amplitudes of the I components of the test signals to initial values (step 302).

Then, controller 10 sets variable N to an initial value (step 303) where N represents a quadrant where a test signal plotted on the I/Q orthogonal coordinate system is present. Therefore, N is selected from integers ranging from 1 to 4.

Then, test signal generator 3 changes to a state in which it generates a point in the Nth quadrant as a test signal (step 304). Specifically, if N=1, test signal generator 3 makes positive the initial values of the amplitudes of I and Q components of the test signal. While this state is being maintained, D/A converters $5_I$, $5_Q$ output DC signals proportional to the test signal. The DC signals are mixed with a local signal by mixers $6_I$, $6_Q$. Therefore, the orthogonal modulator produces an output signal having a constant amplitude. The amplitude of the output signal is detected by envelope detector 8. Since envelope detector 8 generally has square characteristics, the output from envelope detector 8 is a signal proportional to the square of the amplitude of the output signal from the orthogonal modulator.

Then, comparator 9 loads the output from envelope detector 8 (step 305).

Subsequently, controller 10 repeats a process of updating N (step 307) with respect to test signals represented by all four points for N=1, 2, 3, 4, until the trial process of loading the output from envelope detector 8 into comparator 9 is finished (step 306), and also repeats steps 304, 305.

When the process of loading the output from envelope detector 8 into comparator 9 at the time the test signals represented by the four points are generated is finished, comparator 9 calculates the average value (referred to as value 3) of the output from envelope detector 8 at the time N=1 and the output from envelope detector 8 at the time N=3 (step 308).

Then, comparator 9 calculates the average value (referred to as value 4) of the output from envelope detector 8 at the time N=2 and the output from envelope detector 8 at the time N=4 (step 309).

Then, comparator 9 compares the magnitudes of values 3, 4, and transfers the comparison result to controller 10 (step 310).

Then, based on the comparison result from step 310, controller 10 updates the amplitudes of the I components of the test signals so that value 3 and value 4 are equal to each other. Specifically, if value 3 is greater in step 310, then controller 10 decrements the amplitudes of the I components of the test signals at the time N=1, 3 by corrective quantity 2 and increments the amplitudes of the I components of the test signals at the time N=2, 4 by corrective quantity 2 (step 311). If value 4 is greater in step 310, then controller 10 increments the amplitudes of the I components of the test signals at the time N=1, 3 by corrective quantity 2 and decrements the amplitudes of the I components of the test signals at the time N=2, 4 by corrective quantity 2 (step 312).

Subsequently, controller 10 repeats the process of updating corrective quantity 2 (step 314) and the process from step 303 to steps 311, 312 until the trial process from step 303 to steps 311, 312 is finished a predetermined number of times (step 313).

If the trial process is finished a predetermined number of times, then controller 10 calculates an I/Q phase mismatch quantity of the orthogonal modulator based on the ratio of the final amplitudes of the I components of the test signals when N=1, 3 and the final amplitudes of the I components of the test signals when N=2, 4, and calculates an I/Q phase compensation quantity to be set in I/Q mismatch compensator 2 based on the calculated I/Q phase mismatch quantity (step 315).

The mode of compensating for an I/Q phase mismatch is now ended.

Figure 19:
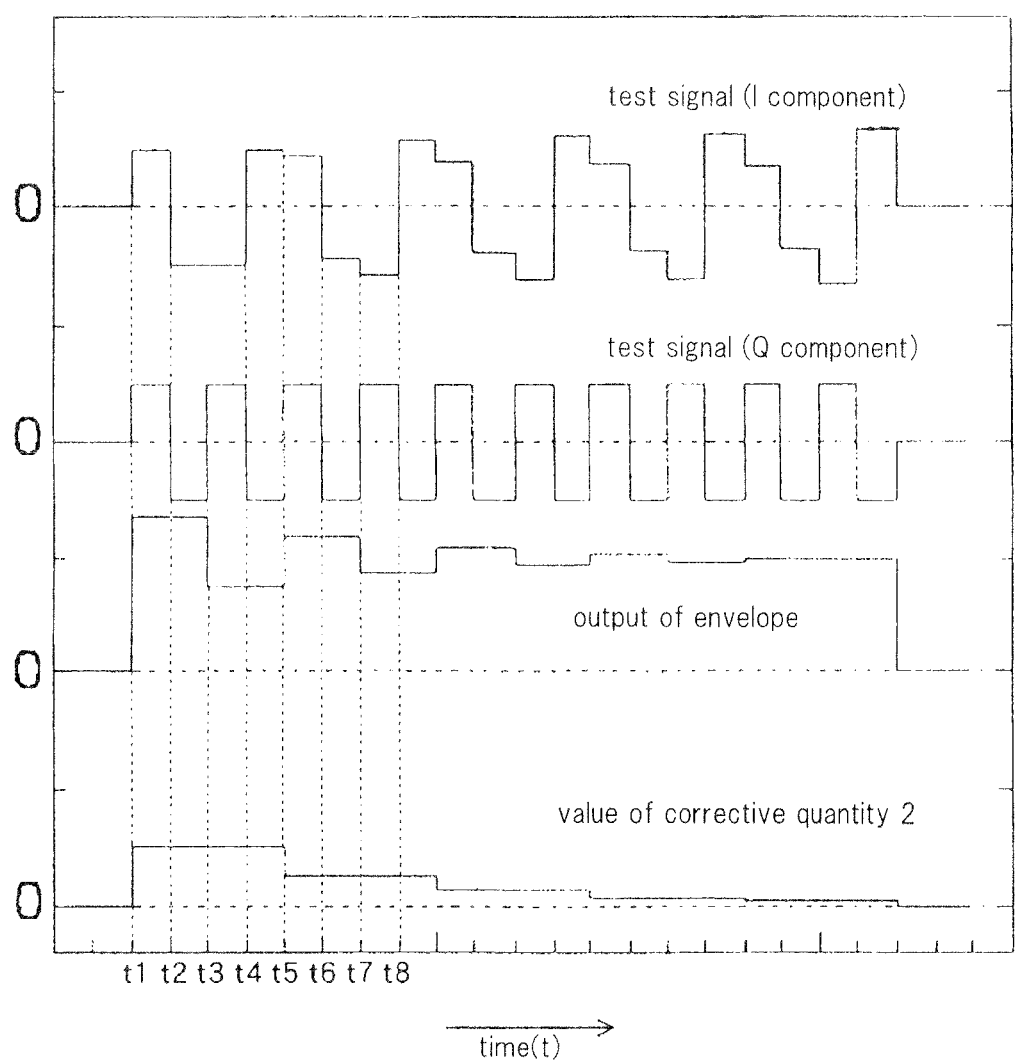
FIG. 19 is a timing chart illustrative of the mode of compensating for an I/Q phase mismatch in the signal processing circuit shown in FIG. 9.

FIG. 19 is a timing chart illustrative of the mode of compensating for an I/Q amplitude mismatch in the signal processing circuit shown in FIG. 9, and shows a time sequence of changes in internal signals. The initial values of the amplitudes of the I and Q components of the test signals are set to different values from each other in order to canceling out an I/Q amplitude mismatch.

As shown in FIG. 19, at times t1 through t4, test signal generator 3 successively outputs test signals in the first, second, third, and fourth quadrants of the I/Q orthogonal coordinate system.

At this time, the average value of outputs from envelope detector 8 when test signals in the first and third quadrants are generated is greater than the average value of outputs from envelope detector 8 when test signals in the second and fourth quadrants are generated.

Therefore, controller 10 decrements the amplitudes of the I components of the test signals in the first and third quadrants by corrective quantity 2, increments the amplitudes of the I components of the test signals in the second and fourth quadrants by corrective quantity 2, and then updates the value of corrective quantity 2 into a smaller value.

Then, at times t5 through t8, test signal generator 3 outputs again test signals represented by four points. The amplitudes of the I components of the test signals in the first and third quadrants have been decremented by corrective quantity 2, and the amplitudes of the I components of the test signals in the second and fourth quadrants have been incremented by corrective quantity 2.

At this time, the average value of outputs from envelope detector 8 when test signals in the first and third quadrants are generated is also greater than the average value of outputs from envelope detector 8 when test signals in the second and fourth quadrants are generated.

Therefore, controller 10 decrements the amplitudes of the I components of the test signals in the first and third quadrants by corrective quantity 2, increments the amplitudes of the I components of the test signals in the second and fourth quadrants by corrective quantity 2, and then updates the value of corrective quantity 2 into a smaller value.

Controller 10 repeats the operation from the outputting of the test signals until the updating of the value of corrective quantity 2, by a predetermined number of times (five times in FIG. 19).

During this time, since controller 10 progressively reduces the value of corrective quantity 2, the difference between the average values progressively approaches 0. Consequently, controller 10 calculates an I/Q phase mismatch quantity of the orthogonal modulator based on the ratio of the amplitudes of the I components of the test signals in the first and third quadrants and the amplitudes of the I components of the test signals in the second and fourth quadrants, and calculates an I/Q phase compensation quantity to be set in I/Q mismatch compensator 2 based on the calculated I/Q phase mismatch quantity. The I/Q phase mismatch quantity and the I/Q phase compensation quantity may be calculated by the method disclosed in Patent document 1, for example, because the I/Q amplitude mismatch quantity and the amplitudes of the Q components are already known.

A first advantage of the present exemplary embodiment will be described below with reference to FIGS. 20 and 21.

Figure 20:
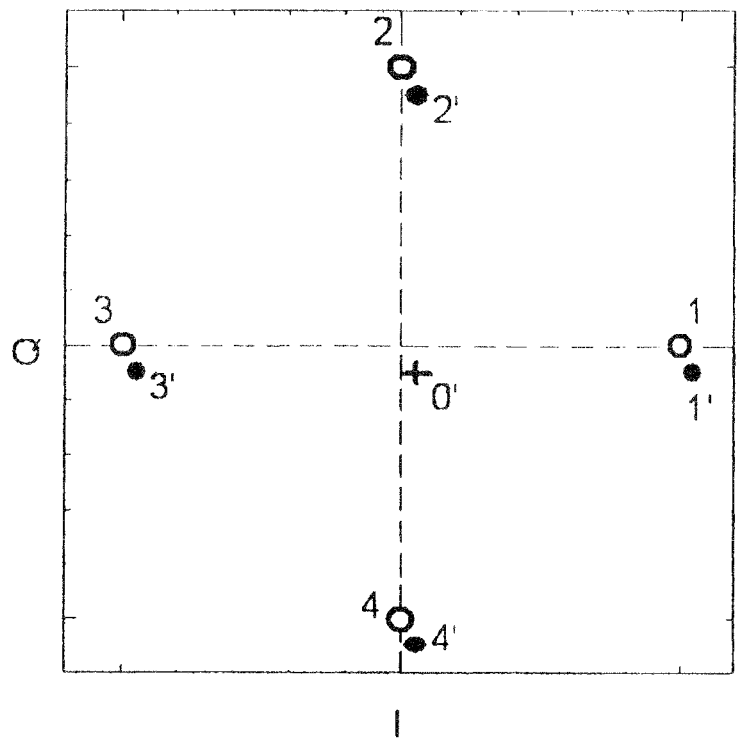
FIG. 20 is a diagram showing the manner in which test signals represented by four points used for the mode of compensating for an I/Q amplitude mismatch in the signal processing circuit shown in FIG. 9 are shifted by a DC offset.

As shown in FIG. 20, it is assumed that test signals represented by four points used in the mode of compensating for an I/Q amplitude mismatch are indicated by (I, Q)=(1, 0), (0, 1), (−1, 0), (0, −1).

If the orthogonal modulator is free of an I/Q amplitude mismatch and a DC offset, then the four points indicated by (I, Q)=(1, 0), (0, 1), (−1, 0), (0, −1) are not shifted and correspond to points 1 through 4 represented by white dots in FIG. 20.

If the orthogonal modulator suffers a DC offset and the origin is shifted to point 0' in FIG. 20, then the above four points are shifted to points 1' through 4' represented by black dots in FIG. 20.

According to the present exemplary embodiment, the average value of the square of the distance from the origin to point 1' and the square of the distance from the origin to point 3' is first obtained. Then, the average value of the square of the distance from the origin to point 2' and the square of the distance from the origin to point 4' is obtained. Then, a looping process is performed to reduce the difference between the above two average values, and an I/Q amplitude mismatch quantity is determined from the ratio of the amplitudes of the I and Q components of the test signals that are finally obtained. At the above stage of the process for obtaining the average values of the squares of the distances, the effect of a remaining DC offset is fully removed to realize an expected operation.

For a quantitative description of the above operation, a DC offset quantity, i.e., the coordinates of point 0' in FIG. 20, is expressed by (a, b). The square of the distance from the origin to point 1' is indicated by $(1+a)^2+b^2$. The square of the distance from the origin to point 3' is indicated by $(1-a)^2+b^2$. These squares are averaged into $1+a^2+b^2$. The average of the square of the distance from the origin to point 2' and square of the distance from the origin to point 4' is also represented by $1+a^2+b^2$. In other words, the effect of a remaining DC offset is fully removed.

Figure 21:
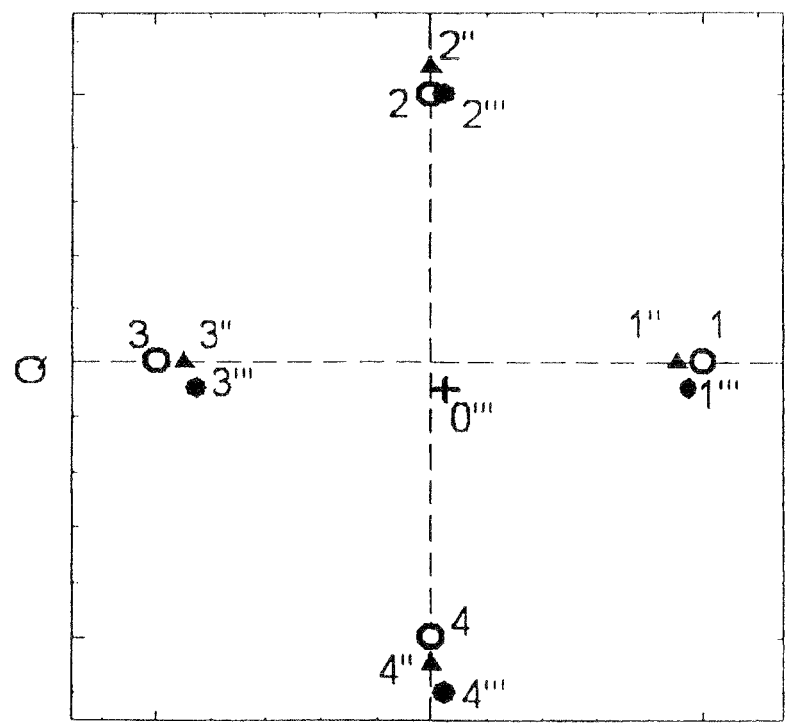
FIG. 21 is a diagram showing the manner in which test signals represented by four points used for the mode of compensating for an I/Q amplitude mismatch in the signal processing circuit shown in FIG. 9 are shifted by a DC offset and an amplitude mismatch.

As shown in FIG. 21, it is assumed that test signals represented by four points used in the mode of compensating for an I/Q amplitude mismatch are indicated by (I, Q)=(1, 0), (0, 1), (−1, 0), (0, −1). These points correspond to points 1 through 4 represented by white dots in FIG. 21.

With an actual transmitting apparatus, these points are shifted to points 1" through 4" represented by black triangles due to an I/Q amplitude mismatch. These points 1" through 4" make up a rectangle whose diagonal lines cross each other at the origin.

The actual transmitting apparatus further poses a DC offset to shift the origin to 0''' in FIG. 21, thereby shifting the above four points to points 1''' through 4''' represented by black dots in FIG. 21.

According to the present exemplary embodiment, the mode of compensating for an I/Q amplitude mismatch uses test signals represented by four points, which comprise two sets of two points positioned in point symmetry with respect to the origin, and also additionally uses the square characteristics of the envelope detector 8 and the averaging process for fully removing the effect of not only an I/Q amplitude mismatch but also a remaining DC offset.

A second advantage of the present exemplary embodiment will be described below with reference to FIGS. 22 and 23.

Figure 22:
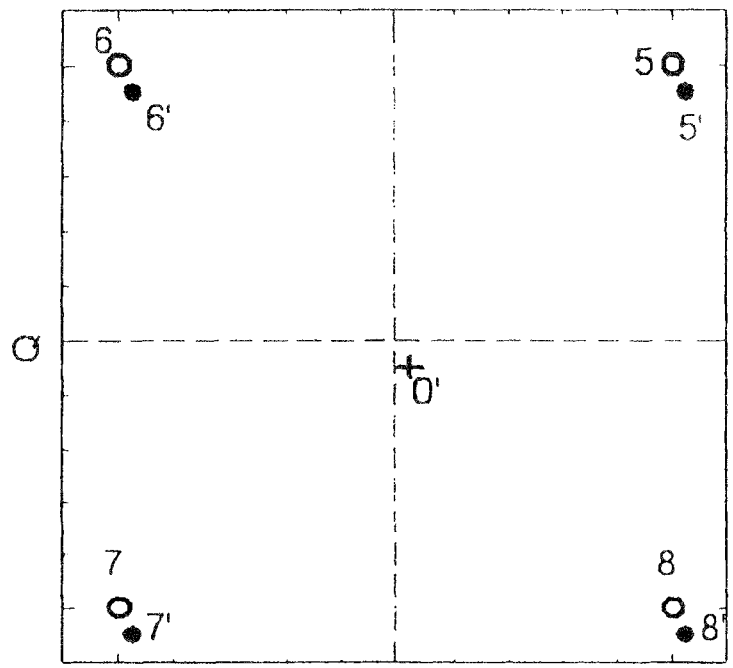
FIG. 22 is a diagram showing the manner in which test signals represented by four points used for the mode of compensating for an I/Q phase mismatch in the signal processing circuit shown in FIG. 9 are shifted by a DC offset.
Figure 23:
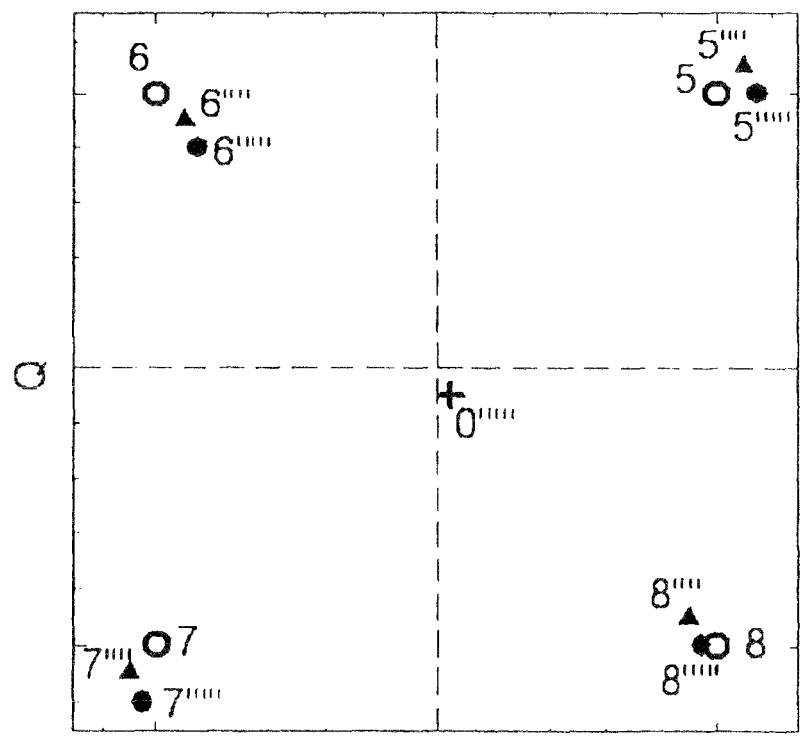
FIG. 23 is a diagram showing the manner in which test signals represented by four points used for the mode of compensating for an I/Q phase mismatch in the signal processing circuit shown in FIG. 9 are shifted by a DC offset and an amplitude mismatch.

As shown in FIGS. 22 and 23, it is assumed that test signals represented by four points N=1, 2, 3, 4 used in the mode of compensating for an I/Q phase mismatch are indicated by (I, Q)=(1, k), (−1, k), (−1, −k), (1, −k). k is selected to compensate for an I/Q amplitude mismatch. If the gain of the I components is 1, then the test signals represented by four points N=1 through 4 are indicated by (I, Q)=(1, 1), (−1, 1), (−1, −1), (1, −1).

As shown in FIG. 22, if the orthogonal modulator is free of an I/Q mismatch and a DC offset, then the test signals represented by the four points indicated by (I, Q)=(1, 1), (−1, 1), (−1, −1), (1, −1) are not shifted and correspond to points 5 through 8 represented by white dots in FIG. 22. In this state, as described above, the method disclosed in Patent document 1 functions normally.

If the orthogonal modulator suffers a DC offset and the origin is shifted to point 0' in FIG. 22, then the above four points are shifted to points 5' through 8' represented by black dots in FIG. 22. In this case, the method disclosed in Patent document 1 does not function normally.

According to the present exemplary embodiment, the outputs from envelope detector 8 having the square characteristics are used to obtain the average value of the square of the distance from the origin to point 5' and the square of the distance from the origin to point 7' and then the average value of the square of the distance from the origin to point 6' and the square of the distance from the origin to point 8'. Then, a looping process is performed to reduce the difference between the above two average values, and an I/Q phase mismatch quantity is determined from the amplitudes of the test signals that are finally obtained. At the above stage of the process for obtaining the average values of the squares of the distances, the effect of a remaining DC offset is fully removed to realize an expected operation.

For a quantitative description of the above operation, a DC offset quantity, i.e., the coordinates of point 0' in FIG. 22, is expressed by (a, b). The square of the distance from the origin to point 5' is indicated by $(1+a)^2+(1+b)^2$. The square of the distance from the origin to point 7' is indicated by $(1-a)^2+(1-b)^2$. These squares are averaged into $1+a^2+b^2$. The average of the square of the distance from the origin to point 6' and square of the distance from the origin to point 8' is also represented by $1+a^2+b''2$. In other words, the effect of a remaining DC offset is fully removed.

As shown in FIG. 23, it is assumed that test signals represented by four points used in the mode of compensating for an I/Q phase mismatch are indicated by (I, Q)=(1, 1), (1, 1), (−1, −1), (1, −1). These points correspond to points 1 through 4 represented by white dots in FIG. 23.

With an actual transmitting apparatus, these points are shifted to points 5"" through 8"" represented by black triangles due to an I/Q phase mismatch. These points 5"" through 8"" make up a lozenge whose diagonal lines cross each other at the origin. In this state, the method disclosed in Patent document 1 functions normally.

The actual transmitting apparatus further poses a DC offset to shift the origin to 0"" in FIG. 23, thereby shifting the above four points to points 5"" through 8"" represented by black dots in FIG. 23. In this case, the method disclosed in Patent document 1 does not function normally.

According to the present exemplary embodiment, the mode of compensating for an I/Q amplitude mismatch uses test signals represented by four points in the first through fourth quadrants, and also additionally uses the square characteristics of the envelope detector 8 and the averaging process for fully removing the effect of not only an I/Q phase mismatch but also a remaining DC offset.

A third advantage of the present exemplary embodiment is that as with the method disclosed in Patent document 1, simplified test signals are used to realize the mode of compensating for an I/Q amplitude mismatch of the orthogonal modulator which is not disclosed in Patent document 1.

A fourth advantage of the present exemplary embodiment will be described below.

According to the present exemplary embodiment, test signals are of a rectangular wave and simpler than sine-wave test signals used according to the background art. Therefore, a ROM area for storing the data of test signals may be smaller. For digitally generating a sine wave, it is necessary to express one wavelength with a plurality of clock pulses, typically several tens of clock pulses, in the time domain. However, for digitally generating rectangular-wave test signals according to the present exemplary embodiment, one wavelength can be expressed with two clock pulses at minimum. If the frequency of test signals used for compensation is the same, then a slower clock system may be operated for simpler implementation and lower power consumption.

A fifth advantage of the present exemplary embodiment will be described below.

According to the present exemplary embodiment, the output values of envelope detector 8 are loaded under four conditions, and divided into two groups of two outputs, whose respective average values are compared with each other. As only the magnitudes of the average values may be known, there is no need for an A/D converter to be connected to envelope detector 8. Therefore, implementation is simpler.

A sixth advantage of the present exemplary embodiment will be described below.

According to the flowchart shown in FIG. 15, DC offsets of respective I and Q components are initially compensated for. However, as described above, certain DC offsets remain due to the resolution of D/A converters $5_I$, $5_Q$ after the mode of compensating for DC offsets. According to the present exemplary embodiment, an I/Q amplitude mismatch and an I/Q phase mismatch can be compensated for without being affected by remaining DC offsets.

In the present exemplary embodiment, according to the flowchart shown in FIG. 15, after DC offsets are compensated for, an I/Q amplitude mismatch and an I/Q phase mismatch are compensated for. However, the present invention is not limited to such a processing sequence. As described above, according to the present exemplary embodiment, an I/Q amplitude mismatch and an I/Q phase mismatch can be compensated for without being affected by remaining DC offsets. Therefore, an I/Q amplitude mismatch or an I/Q phase mismatch may be compensated for before DC offsets are compensated for.

In the present exemplary embodiment, according to the flowchart shown in FIG. 15, DC offsets, an I/Q amplitude mismatch, and an I/Q phase mismatch are all compensated for. However, the present invention is not limited to such a processing sequence. Specifically, if the wireless communication system applied to the transmitting apparatus has moderate standards for DC offsets, then the standards may be satisfied without the need for compensation for the DC offsets. The mode of compensating for an I/Q amplitude mismatch according to the present exemplary embodiment is not affected by remaining DC offsets. Accordingly, it is possible to compensate for an I/Q amplitude mismatch and an I/Q phase mismatch without compensating for DC offsets. According to another example, an I/Q amplitude mismatch may be negligibly small even without performing a compensating process. In such a case, the mode of compensating for an I/Q amplitude mismatch may be omitted. According to still another example, the wireless communication system applied to the transmitting apparatus may have standards that can be satisfied even if an I/Q phase mismatch is not compensated for. In such a case, the mode of compensating for an I/Q phase mismatch may be omitted.

According to the present exemplary embodiment, it is expected that the trial process is repeated a fixed number of times in the flowcharts shown in FIGS. 16 and 18. However, the present invention is not limited to such a processing sequence. Controller 10 may calculate the ratio of the amplitudes of the I components of the test signals before and after they are updated, compare the calculated ratio with a preset threshold value, and determine the number of times that the trial process is performed based on the comparison result.

According to the present exemplary embodiment, the two flowcharts shown in FIGS. 16 and 18 are carried out independently of each other. However, the present invention is not limited to such a processing sequence. The flowcharts shown in FIGS. 16 and 18 may be merged together. Specifically, the trial process from step 203 to steps 210, 211 shown in FIG. 16 and the trial process from step 303 to steps 311, 312 shown in FIG. 18 may be alternately carried out. It is also possible to combine the merged flowchart with the mode of compensating for DC offsets according to the background art.

According to the present exemplary embodiment, envelope detector 8 has square characteristics. However, the present invention is not limited to such an envelope detector, but may use an envelope detector having characteristics whose power ranges from a value greater than 1 to a value smaller than 3. Envelope detector 8 may have linear characteristics. If envelope detector 8 has linear characteristics, then the mode of compensating for an I/Q phase mismatch and an I/Q amplitude mismatch tends to be affected by remaining DC offsets. However, the effect of remaining DC offsets is made smaller than with the method disclosed in Patent document 1, for example.

According to the present exemplary embodiment, the amplitudes of the I components of the test signals are adjusted in the flowcharts shown in FIGS. 16 and 18. However, the present invention is not limited to such a processing sequence. In the flowcharts shown in FIGS. 16 and 18, it is possible to adjust the amplitudes of the Q components of the test signals, and also to simultaneously adjust the amplitudes of the I and Q components of the test signals.

2nd Exemplary Embodiment

Figure 24:
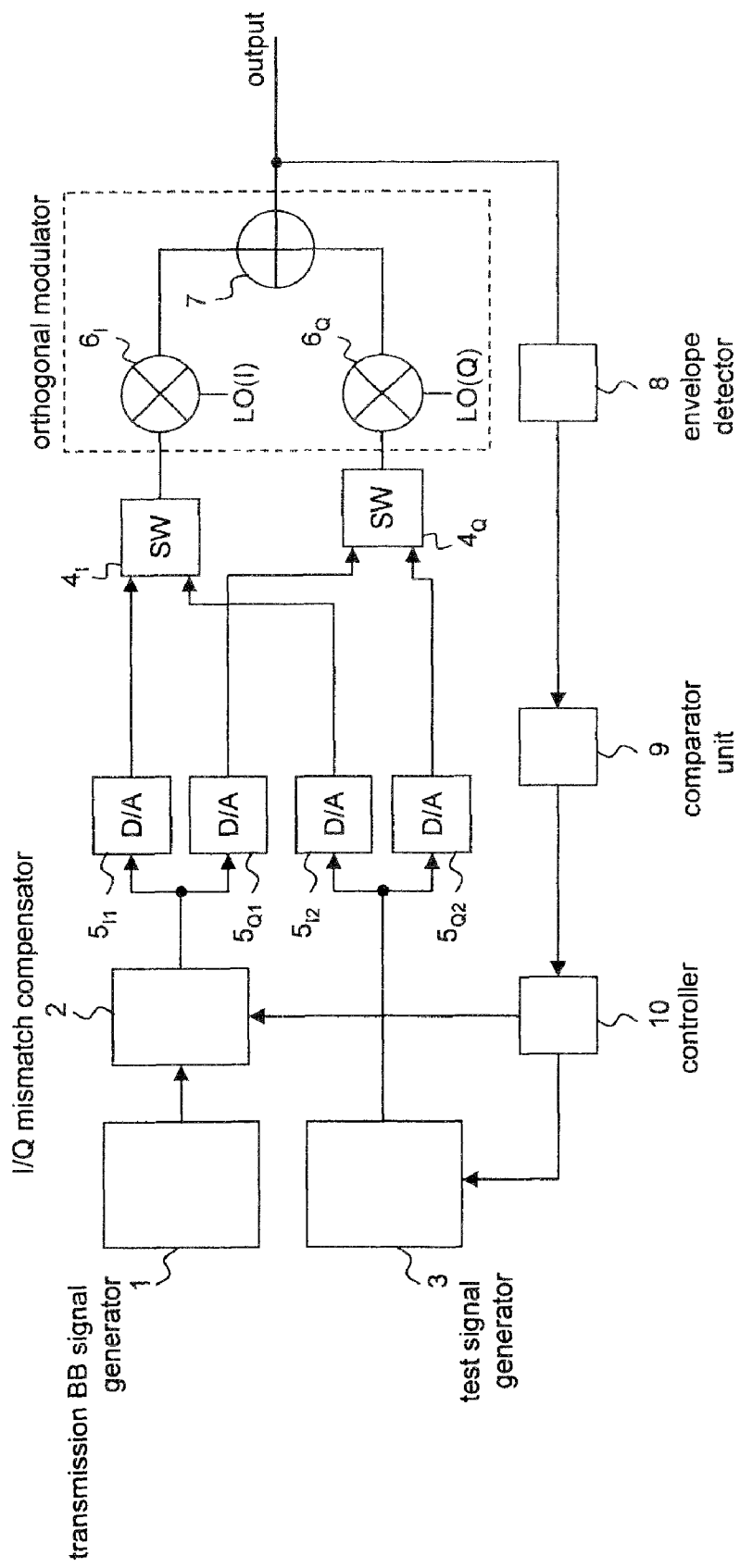
FIG. 24 is a block diagram showing the overall arrangement of a signal processing circuit according to a second exemplary embodiment of the present invention.

FIG. 24 is a block diagram showing the overall arrangement of a signal processing circuit according to a second exemplary embodiment of the present invention.

As shown in FIG. 24, the signal processing circuit according to the present exemplary embodiment is different from the first exemplary embodiment shown in FIG. 9 in that two D/A converters $5_{I1}$, $5_{Q1}$ for I components and Q components are connected to I/Q mismatch compensator 2, two D/A converters $5_{I2}$, $5_{Q2}$ for I components and Q components are connected to test signal generator 3, and two switches $4_I$, $4_Q$ for I components and Q components are connected to the rear stages of D/A converters $5_{I1}$, $5_{Q1}$, $5_{I2}$, $5_{Q2}$.

Switch $4_I$ selects an output from D/A converter $5_{I1}$ in the transmitting process and selects an output from D/A converter $5_{I2}$ in the compensating process. Switch $4_Q$ selects an output from D/A converter $5_{Q1}$ in the transmitting process and selects an output from D/A converter $5_{Q2}$ in the compensating process.

The present exemplary embodiment is advantageous in that when the speed and resolution required of the D/A converters in the transmission process and the speed and resolution required of the D/A converters in the compensating process are widely different from other, their requirements can both be satisfied.

Specifically, if D/A converters which are high in speed and low in resolution are required in the transmitting process, then such D/A converters are assigned to D/A converters $5_{I1}$, $5_{Q1}$. If D/A converters which are low in speed and high in resolution are required in the compensating process, then such D/A converters are assigned to D/A converters $5_{I2}$, $5_{Q2}$. In this manner, useless implementation can be avoided.

3rd Exemplary Embodiment

Figure 25:
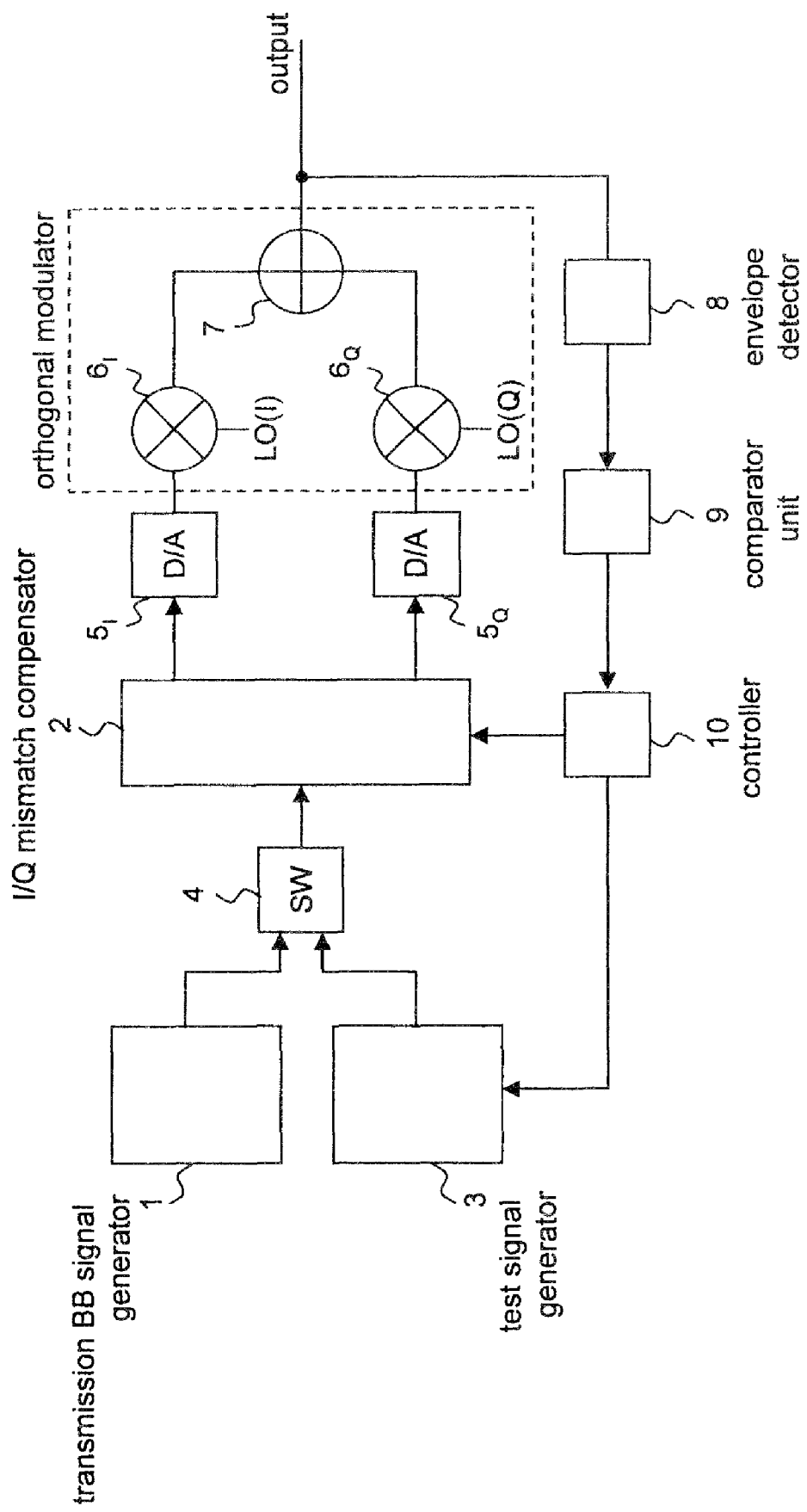
FIG. 25 is a block diagram showing the overall arrangement of a signal processing circuit according to a third exemplary embodiment of the present invention.

FIG. 25 is a block diagram showing the overall arrangement of a signal processing circuit according to a third exemplary embodiment of the present invention.

As shown in FIG. 25, the signal processing circuit according to the present exemplary embodiment is different from the first exemplary embodiment shown in FIG. 9 in that the test signals generated by test signal generator 3 are supplied through switch 4 and I/Q mismatch compensator 2 and input to D/A converters $5_I$, $5_Q$.

Operation of the signal processing circuit according to the present exemplary embodiment will be described below.

Figure 26:
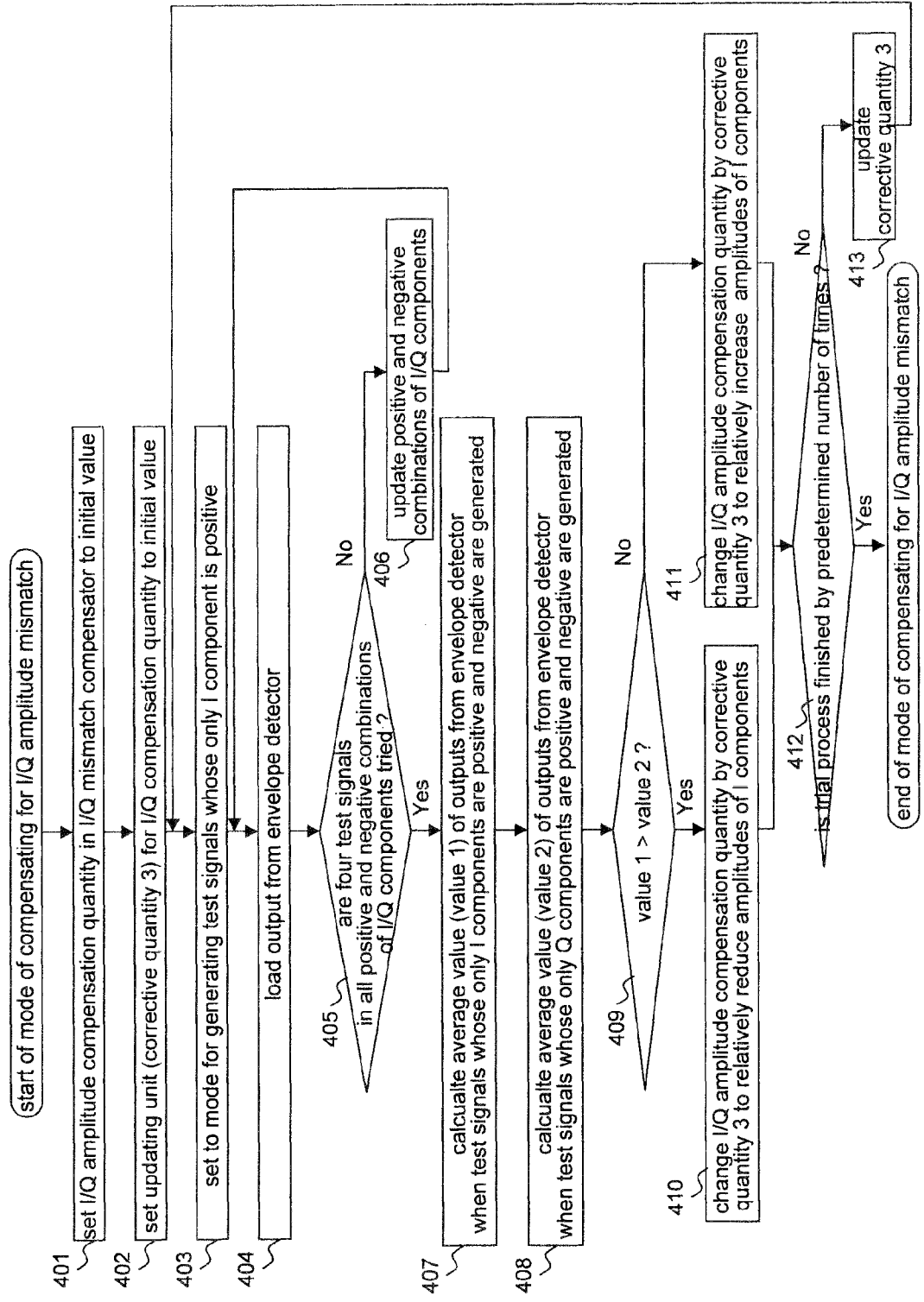
FIG. 26 is a flowchart illustrative of a mode of compensating for an I/Q amplitude mismatch in the signal processing circuit shown in FIG. 25.

FIG. 26 is a flowchart illustrative of a mode of compensating for an I/Q amplitude mismatch in the signal processing circuit shown in FIG. 25.

As shown in FIG. 26, controller 10 sets an I/Q amplitude compensation quantity to be set in I/Q mismatch compensator 2 to an initial value (step 401).

Then, controller 10 sets an updating unit (hereinafter referred to as corrective quantity 3) for updating the I/Q amplitude compensation quantity to an initial value (step 402).

The processing operation from next step 403 to step 409 is the same as the processing operation from step 203 to step 209 shown in FIG. 16 which has been described above.

If value 1 is greater in step 409, then controller 10 changes the I/Q amplitude compensation quantity by corrective quantity 3 in a direction to relatively reduce the amplitudes of the I components (step 410). If value 2 is greater in step 409, then controller 10 changes the I/Q amplitude compensation quantity by corrective quantity 3 in a direction to relatively increase the amplitudes of the I components (step 411).

Subsequently, controller 10 repeats the process of updating corrective quantity 3 (step 413) and the process from step 403 to steps 410, 411 until the trial process from step 403 to steps 410, 411 is finished a predetermined number of times (step 412).

If the trial process is finished a predetermined number of times, then the mode of compensating for an I/Q amplitude mismatch is ended.

Figure 27:
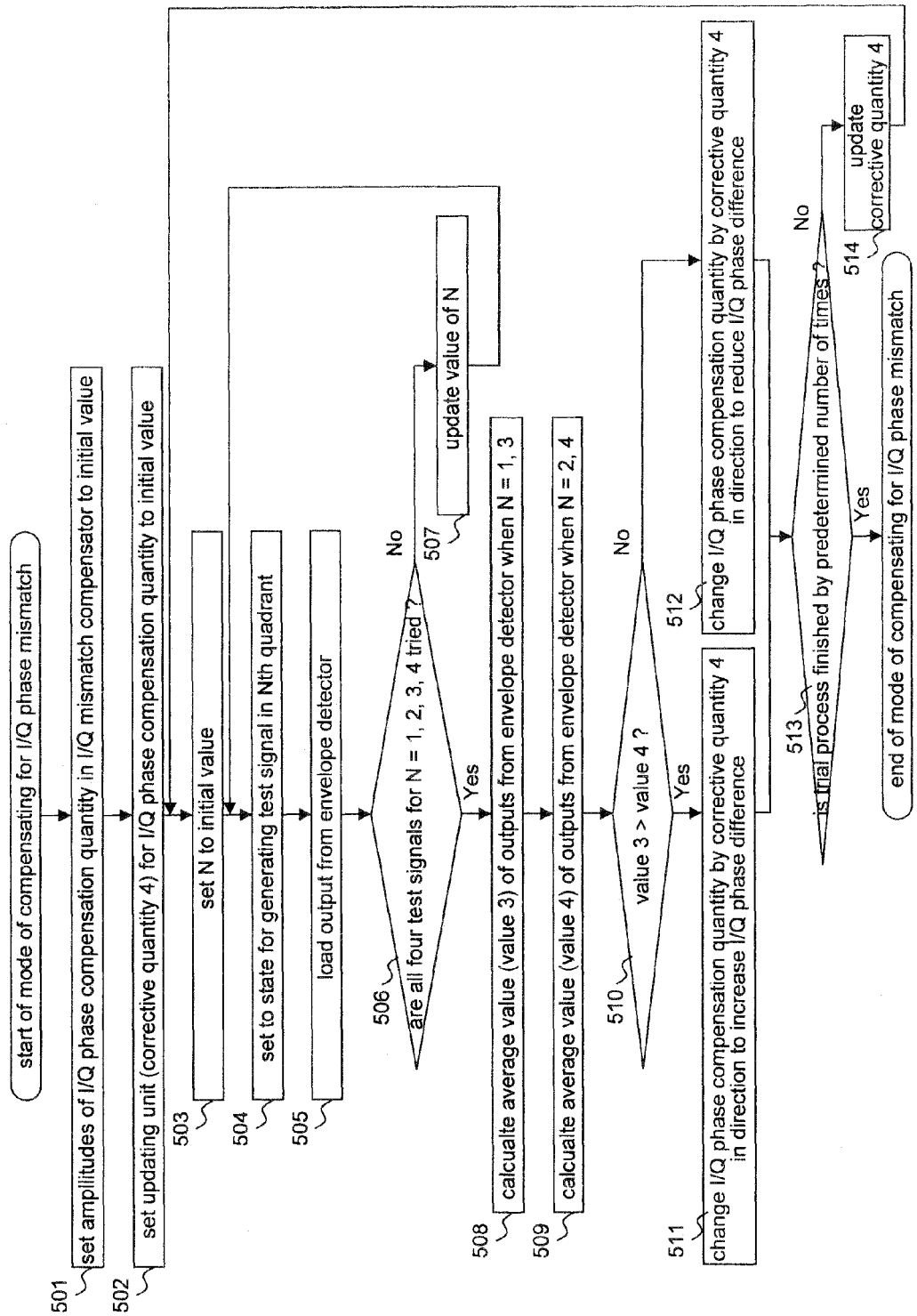
FIG. 27 is a flowchart illustrative of a mode of compensating for an I/Q phase mismatch in the signal processing circuit shown in FIG. 25.

FIG. 27 is a flowchart illustrative of a mode of compensating for an I/Q phase mismatch in the signal processing circuit shown in FIG. 25.

As shown in FIG. 27, controller 10 sets an I/Q phase compensation quantity to be set in I/Q mismatch compensator 2 to an initial value (step 501).

Then, controller 10 sets an updating unit (hereinafter referred to as corrective quantity 4) for updating the I/Q phase compensation quantity to an initial value (step 502).

The processing operation from next step 503 to step 510 is the same as the processing operation from step 303 to step 310 shown in FIG. 18 which has been described above.

If value 3 is greater in step 510, then controller 10 changes the I/Q phase compensation quantity by corrective quantity 4 in a direction to increase the I/Q phase difference (step 511). If value 4 is greater in step 510, then controller 10 changes the I/Q phase compensation quantity by corrective quantity 4 in a direction to reduce the I/Q phase difference (step 512).

Subsequently, controller 10 repeats the process of updating corrective quantity 4 (step 514) and the process from step 503 to steps 511, 512 until the trial process from step 503 to steps 511, 512 is finished a predetermined number of times (step 513).

If the trial process is finished a predetermined number of times, then the mode of compensating for an I/Q phase mismatch is ended.

According to the present exemplary embodiment, it is expected that the trial process is repeated a fixed number of times in the flowcharts shown in FIGS. 26 and 27. However, the present invention is not limited to such a processing sequence. Controller 10 may calculate the ratio of the I/Q amplitude compensation quantity and the I/Q phase compensation quantity before and after they are updated, compare the calculated ratio with a preset threshold value, and determine the number of times that the trial process is performed based on the comparison result.

4th Exemplary Embodiment

Figure 28:
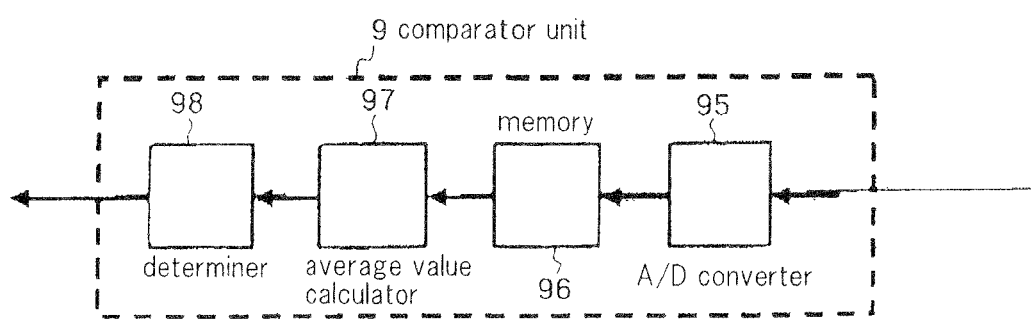
FIG. 28 is a block diagram of a comparator unit of a signal processing circuit according to a fourth exemplary embodiment of the present invention.

FIG. 28 is a block diagram of a comparing unit of a signal processing circuit according to a fourth exemplary embodiment of the present invention.

As shown in FIG. 28, comparing unit 9 according to the present exemplary embodiment comprises ND converter 95, memory 96, average value calculator 97, and determiner 98. Comparing unit 9 shown in FIG. 28 is also applicable to either one of the signal processing circuits shown in FIGS. 9, 25, and 26.

A/D converter 95 converts the output from envelope detector 8 from an analog signal into a digital signal. Memory 96 stores the digital output from envelope detector 8.

Average value calculator 97 calculates values 1, 2 shown in FIG. 16, etc. and values 3, 4 shown in FIG. 18, etc. using the output data of envelope detector 8 stored in memory 96. Determiner 98 determines the magnitudes of values 1, 2 and the magnitudes of values 3, 4.

5th Exemplary Embodiment

Figure 29:
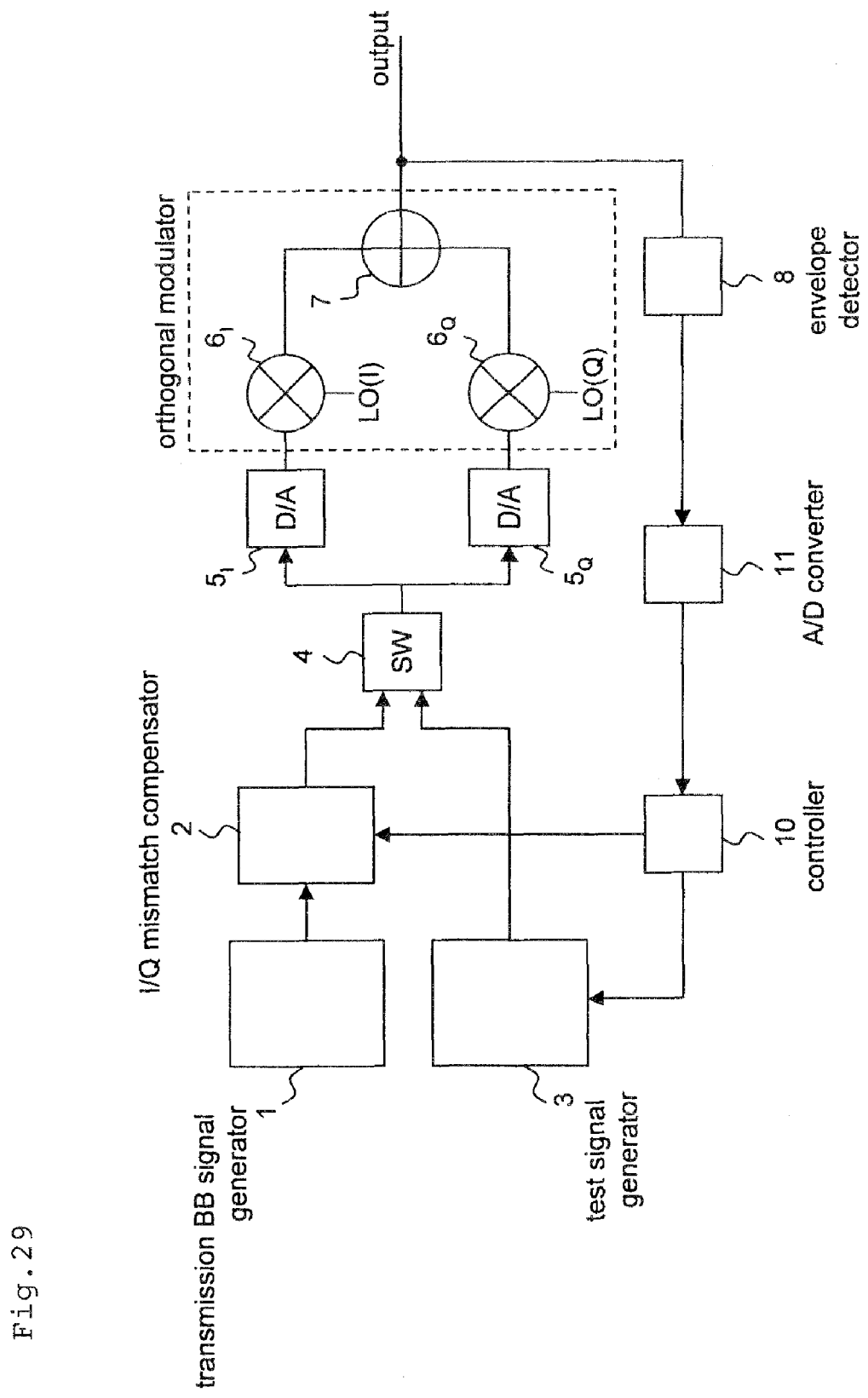
FIG. 29 is a block diagram showing the overall arrangement of a signal processing circuit according to a fifth exemplary embodiment of the present invention.

FIG. 29 is a block diagram showing the overall arrangement of a signal processing circuit according to a fifth exemplary embodiment of the present invention.

As shown in FIG. 29, the signal processing circuit according to the present exemplary embodiment is different from the first exemplary embodiment shown in FIG. 9 in that A/D converter 11 is provided instead of comparator 9.

Operation of the signal processing circuit according to the present exemplary embodiment will be described below.

Figure 30:
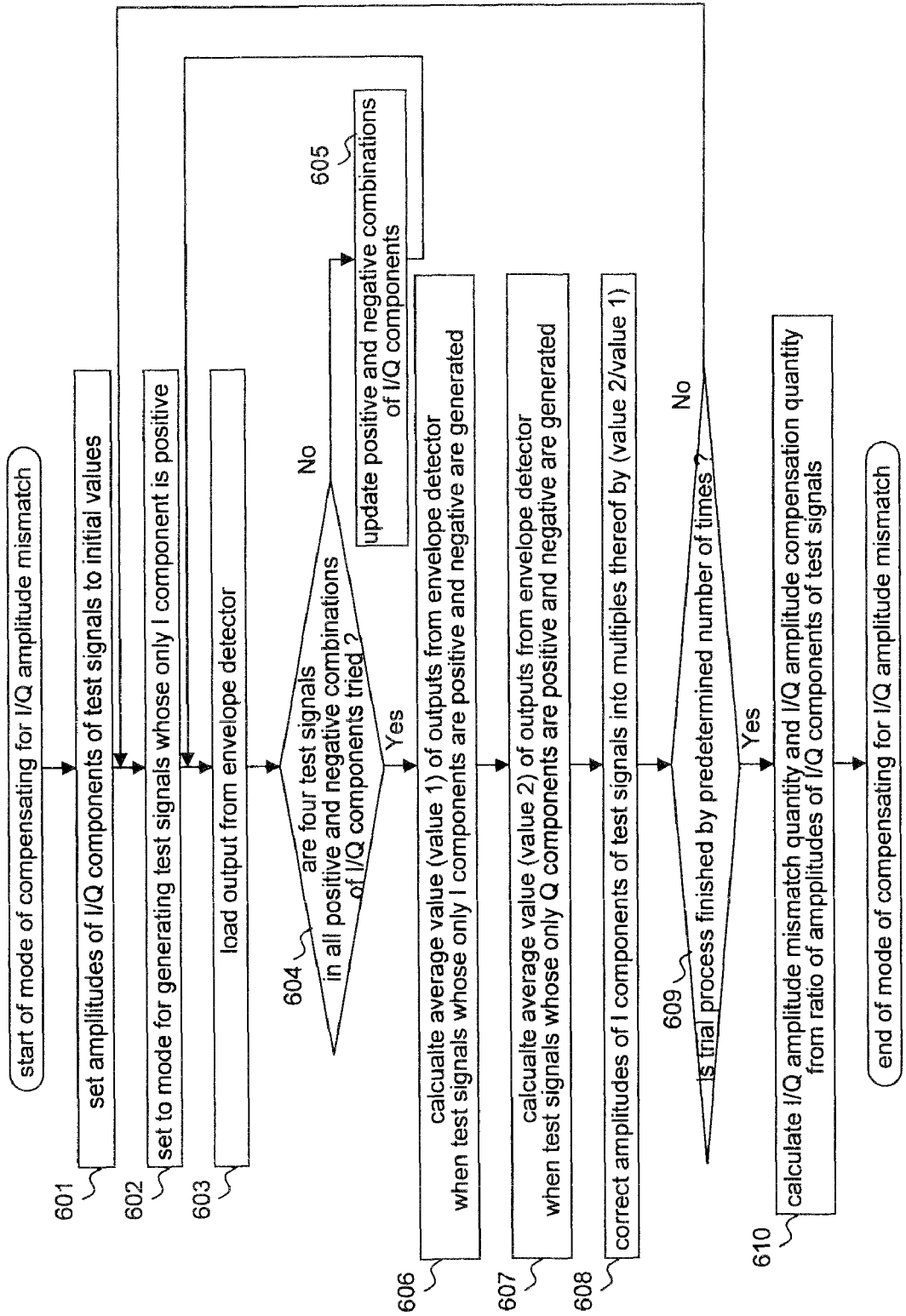
FIG. 30 is a flowchart illustrative of a mode of compensating for an I/Q amplitude mismatch in the signal processing circuit shown in FIG. 29.

FIG. 30 is a flowchart illustrative of a mode of compensating for an I/Q amplitude mismatch in the signal processing circuit shown in FIG. 29.

As shown in FIG. 30, controller 10 sets the amplitudes of I and Q components of test signals to initial values (step 601).

The processing operation from next step 602 to step 607 is the same as the processing operation from step 203 to step 208 shown in FIG. 16 which has been described above. According to the present exemplary embodiment, since corrective quantity 1 (FIG. 16) as the updating unit for the amplitudes of I components of the test signals is not present, the process of setting corrective quantity 1 to an initial value is omitted. In steps 606, 607, controller 10 calculates values 1, 2 as digital numerical data.

Then, controller 10 updates the amplitudes of I components of the test signals so that value 1 and value 2 are equal to each other, based on the calculated results from steps 606, 607. Specifically, controller 10 calculates value 2/value 1 and corrects the amplitudes of I components of the test signals into multiples thereof by (value 2/value 1) (step 608).

Subsequently, controller 10 repeats the trial process from step 602 to step 608 a predetermined number of times (step 609).

If the trial process is finished a predetermined number of times, then controller 10 calculates an I/Q amplitude mismatch quantity of the orthogonal modulator based on the ratio of the final amplitudes of the I components of the test signals and the amplitudes of the Q components of the test signals, and calculates an I/Q amplitude compensation quantity to be set in I/Q mismatch compensator 2 based on the calculated I/Q amplitude mismatch quantity (step 610).

The mode of compensating for an I/Q amplitude mismatch is now ended.

According to the present exemplary embodiment, a condition for making value 1 and value 2 equal to each other can be estimated with accuracy, using the ratio of value 1 and value 2. Using such a condition, it is possible to dispense with a conditional branch based on whether the trial process is finished a predetermined number of times in step 609 shown in FIG. 30, and complete the mode of compensating for an I/Q amplitude mismatch in one trial process.

Figure 31:
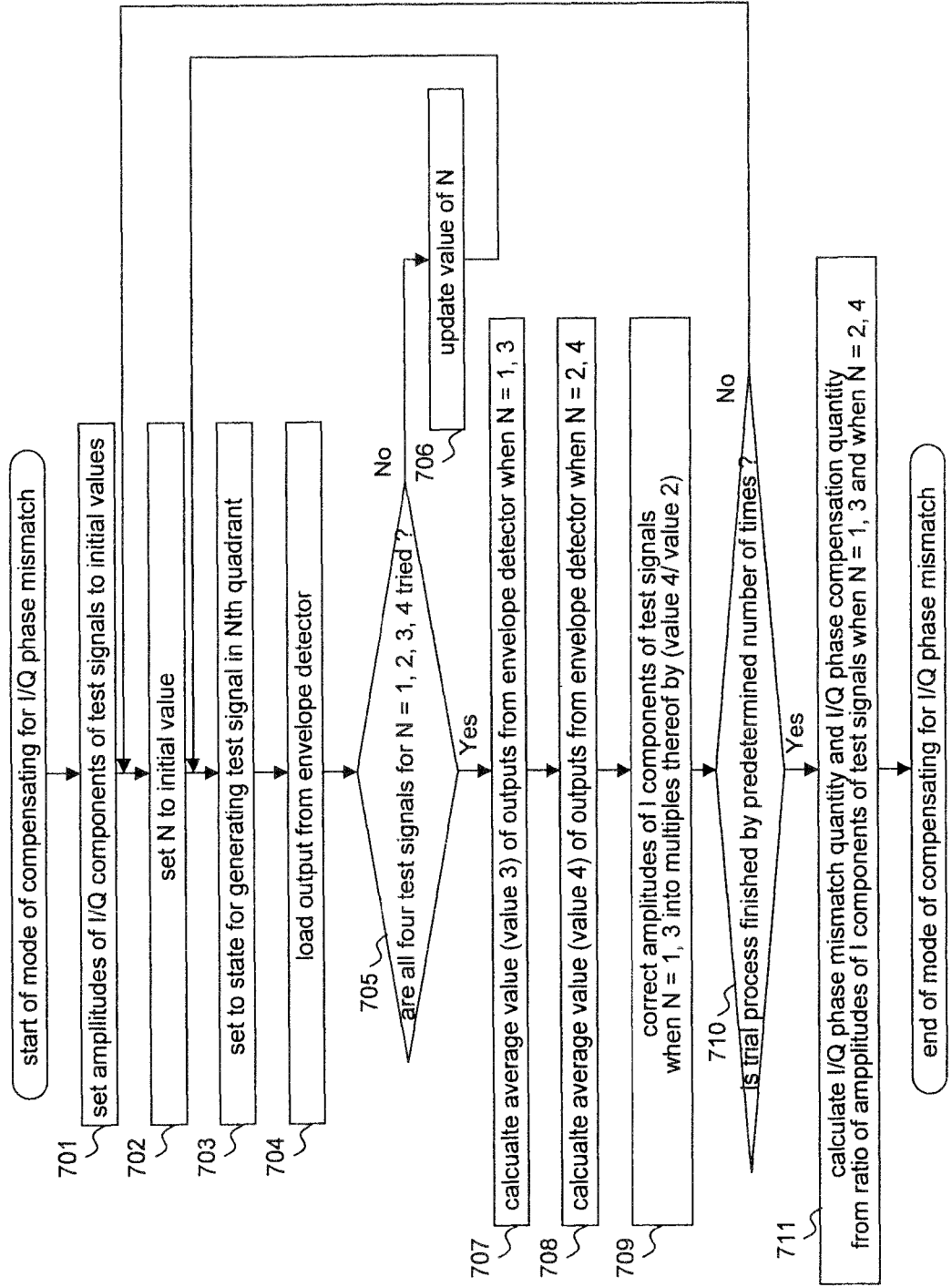
FIG. 31 is a flowchart illustrative of a mode of compensating for an I/Q phase mismatch in the signal processing circuit shown in FIG. 29.

FIG. 31 is a flowchart illustrative of a mode of compensating for an I/Q phase mismatch in the signal processing circuit shown in FIG. 29.

As shown in FIG. 31, controller 10 sets the amplitudes of I and Q components of test signals to initial values (step 701).

The processing operation from next step 702 to step 708 is the same as the processing operation from step 303 to step 309 shown in FIG. 18 which has been described above. According to the present exemplary embodiment, since corrective quantity 2 (FIG. 18) as the updating unit for the amplitudes of I components of the test signals is not present, the process of setting corrective quantity 2 to an initial value is omitted. In steps 707, 708, controller 10 calculates values 3, 4 as digital numerical data.

Then, controller 10 updates the amplitudes of I components of the test signals at the time N=1, 3 so that value 3 and value 4 are equal to each other, based on the calculated results from steps 707, 708. Specifically, controller 10 calculates value 4/value 3 and corrects the amplitudes of I components of the test signals at the time N=1, 3 into multiples thereof by (value 4/value 3) (step 709).

Subsequently, controller 10 repeats the trial process from step 702 to step 709 a predetermined number of times (step 710).

If the trial process is finished a predetermined number of times, then controller 10 calculates an I/Q phase mismatch quantity of the orthogonal modulator based on the ratio of the final amplitudes of the I components of the test signals at the time N=1, 3 and the amplitudes of the Q components of the test signals at the time N=2, 4, and calculates an I/Q phase compensation quantity to be set in I/Q mismatch compensator 2 based on the calculated I/Q phase mismatch quantity (step 711).

The mode of compensating for an I/Q phase mismatch is now ended.

According to the present exemplary embodiment, a condition for making value 3 and value 4 equal to each other can be estimated with accuracy, using the ratio of value 3 and value 4. Using such a condition, it is possible to dispense with a conditional branch based on whether the trial process is finished a predetermined number of times in step 710 shown in FIG. 31, and complete the mode of compensating for an I/Q phase mismatch in one trial process.

6th Exemplary Embodiment

Figure 32:
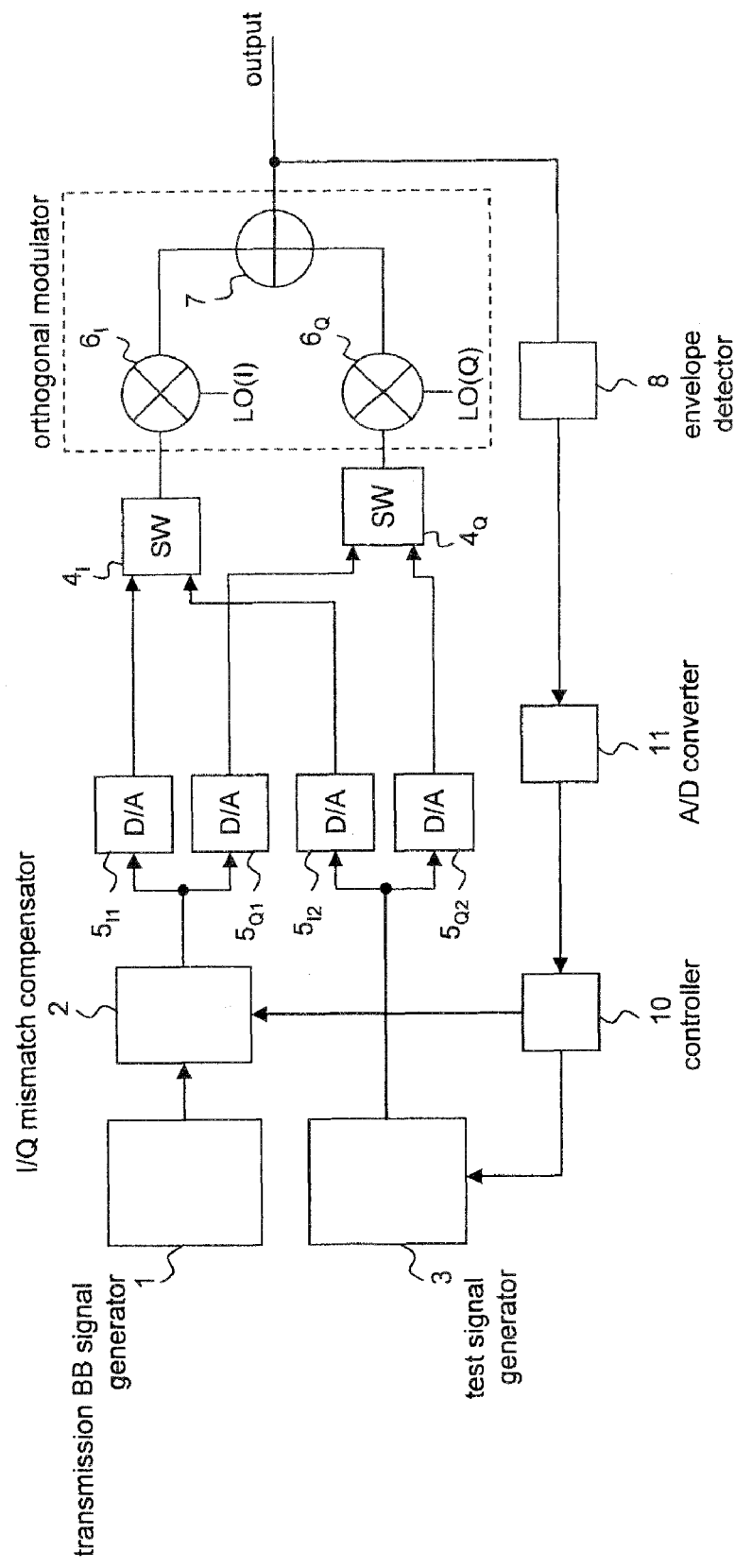
FIG. 32 is a block diagram showing the overall arrangement of a signal processing circuit according to a sixth exemplary embodiment of the present invention.

FIG. 32 is a block diagram showing the overall arrangement of a signal processing circuit according to a sixth exemplary embodiment of the present invention.

As shown in FIG. 32, the signal processing circuit according to the present exemplary embodiment is different from the fifth exemplary embodiment shown in FIG. 29 in that two D/A converters $5_{I1}, 5_{Q1}$ for I components and Q components are connected to I/Q mismatch compensator 2, two D/A converters $5_{I2}, 5_{Q2}$ for I components and Q components are connected to test signal generator 3, and two switches $4_I, 4_Q$ for I components and Q components are connected to the rear stages of D/A converters $5_{I1}, 5_{Q1}, 5_{I2}, 5_{Q2}$.

The advantages of the present exemplary embodiment over the fifth exemplary embodiment have been described with respect to the second exemplary embodiment.

7th Exemplary Embodiment

Figure 33:
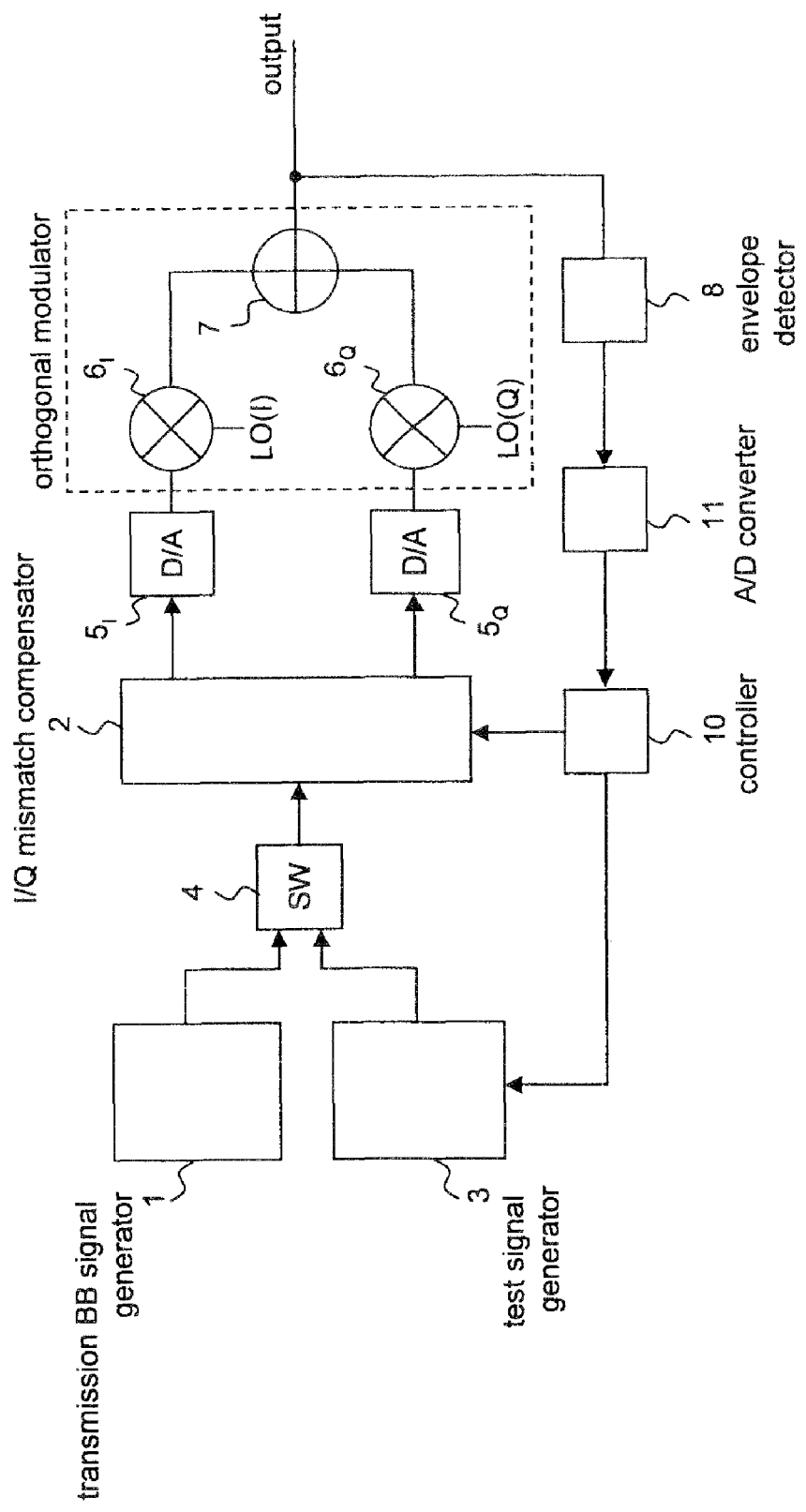
FIG. 33 is a block diagram showing the overall arrangement of a signal processing circuit according to a seventh exemplary embodiment of the present invention.

FIG. 33 is a block diagram showing the overall arrangement of a signal processing circuit according to a seventh exemplary embodiment of the present invention.

As shown in FIG. 33, the signal processing circuit according to the present exemplary embodiment is different from the third exemplary embodiment shown in FIG. 25 in that A/D converter 11 is provided instead of comparing unit 9.

Operation of the signal processing circuit according to the present exemplary embodiment will be described below.

Figure 34:
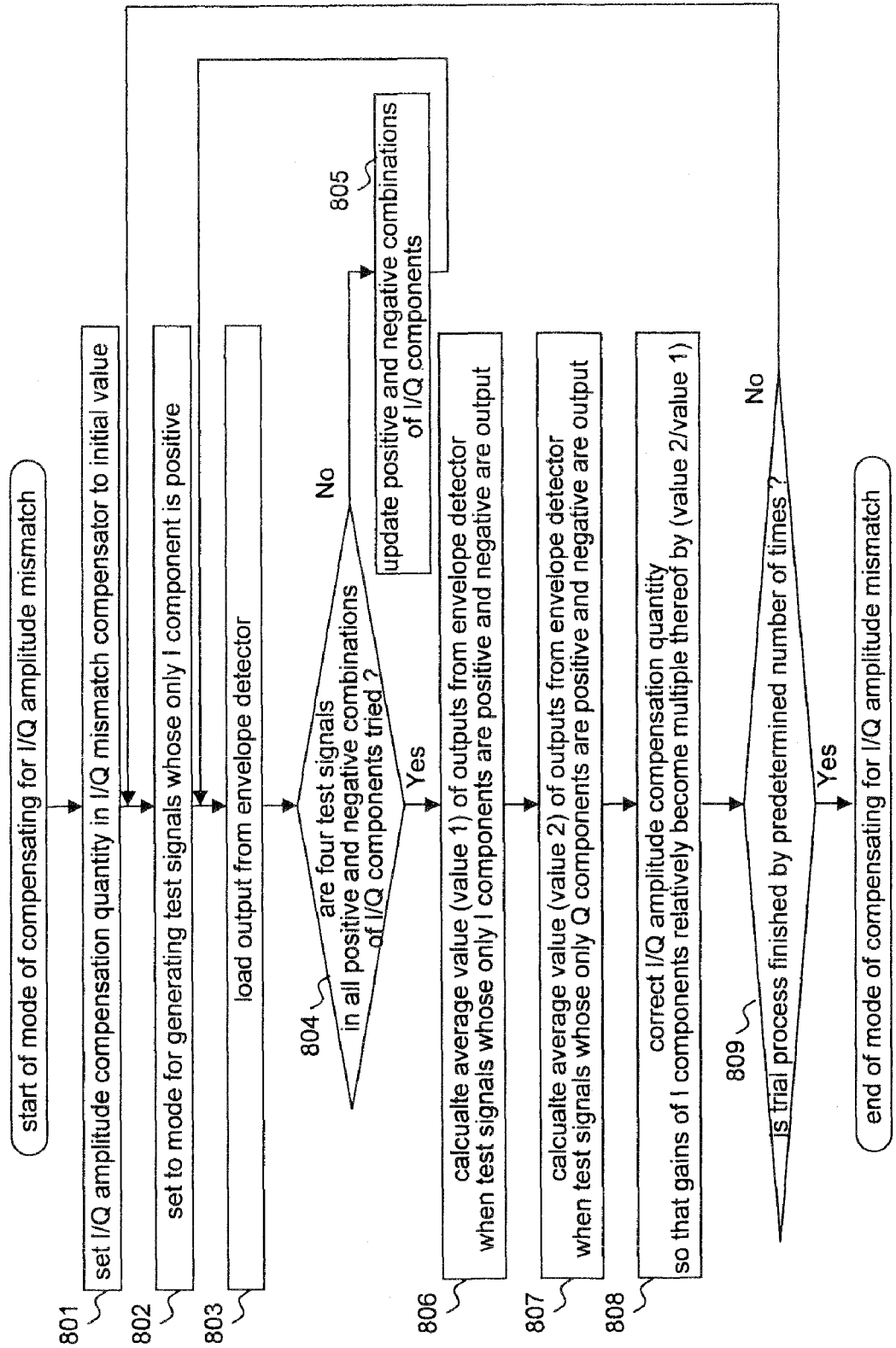
FIG. 34 is a flowchart illustrative of a mode of compensating for an I/Q amplitude mismatch in the signal processing circuit shown in FIG. 33.

FIG. 34 is a flowchart illustrative of a mode of compensating for an I/Q amplitude mismatch in the signal processing circuit shown in FIG. 33.

As shown in FIG. 34, controller 10 sets an I/Q amplitude compensation quantity to be set in I/Q mismatch compensator 2 to an initial value (step 801).

The processing operation from next step 802 to step 807 is the same as the processing operation from step 403 to step 408 shown in FIG. 26 which has been described above. According to the present exemplary embodiment, since corrective quantity 3 (FIG. 26) as the updating unit for the I/Q amplitude compensation quantity is not present, the process of setting corrective quantity 3 to an initial value is omitted. In steps 806, 807, controller 10 calculates values 1, 2 as digital numerical data.

Then, controller 10 updates the I/Q amplitude compensation quantity so that value 1 and value 2 are equal to each other, based on the calculated results from steps 806, 807. Specifically, controller 10 calculates value 2/value 1 and corrects the I/Q amplitude compensation quantity so that the gains of the I components relatively become multiples thereof by (value 2/value 1) (step 808).

Subsequently, controller 10 repeats the trial process from step 802 to step 809 a predetermined number of times (step 809).

If the trial process is finished a predetermined number of times, then the mode of compensating for an I/Q amplitude mismatch is now ended.

According to the present exemplary embodiment, a condition for making value 1 and value 2 equal to each other can be estimated with accuracy, using the ratio of value 1 and value 2. Using such a condition, it is possible to dispense with a conditional branch based on whether the trial process is finished a predetermined number of times in step 809 shown in FIG. 34, and complete the mode of compensating for an I/Q amplitude mismatch in one trial process.

Figure 35:
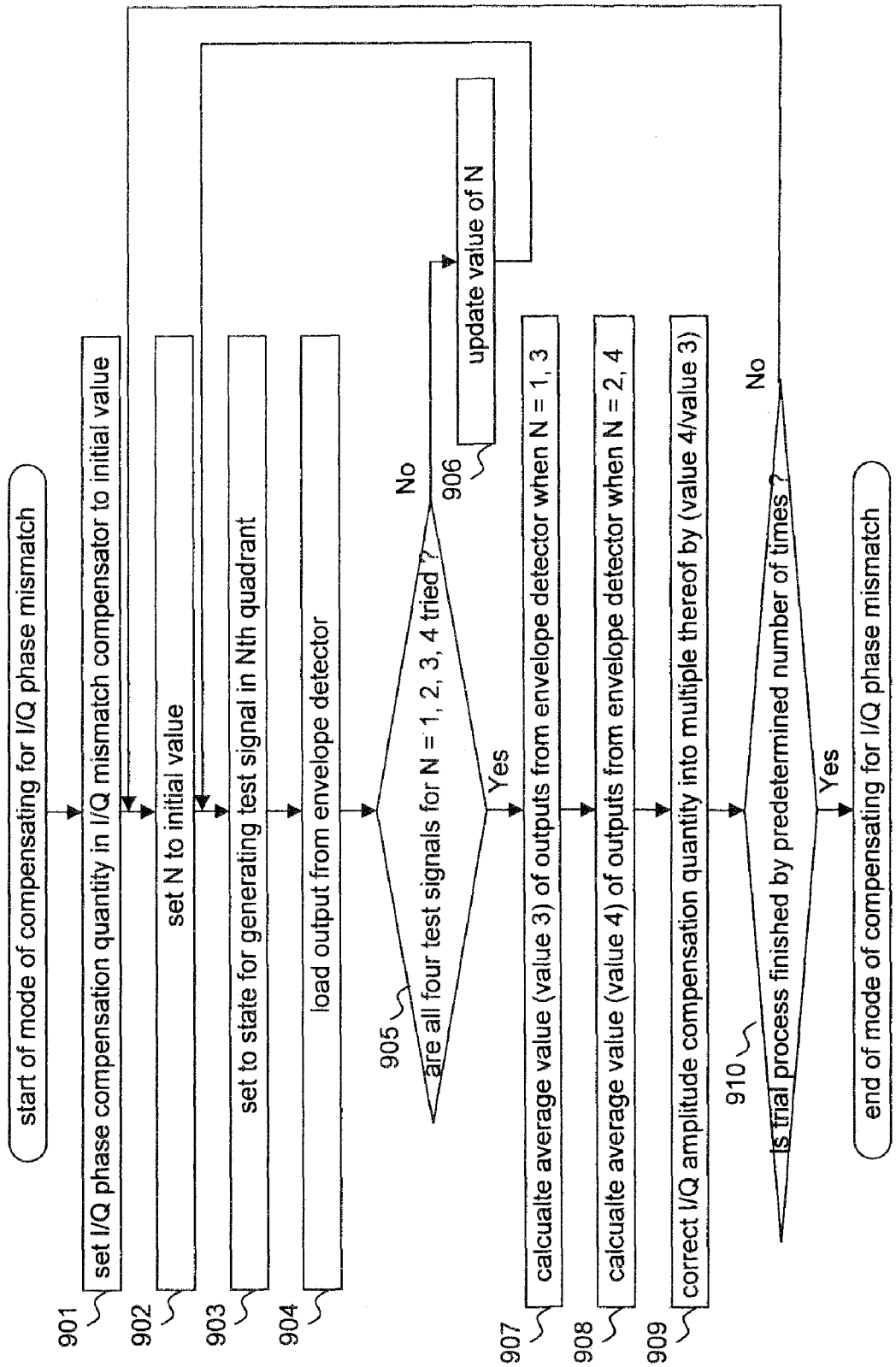
FIG. 35 is a flowchart illustrative of a mode of compensating for an I/Q phase mismatch in the signal processing circuit shown in FIG. 33.

FIG. 35 is a flowchart illustrative of a mode of compensating for an I/Q phase mismatch in the signal processing circuit shown in FIG. 33.

As shown in FIG. 35, controller 10 sets an I/Q phase compensation quantity to be set in I/Q mismatch compensator 2 to an initial value (step 901).

The processing operation from next step 902 to step 908 is the same as the processing operation from step 503 to step 509 shown in FIG. 27 which has been described above. According to the present exemplary embodiment, since corrective quantity 4 (FIG. 27) as the updating unit for the I/Q amplitude compensation quantity is not present, the process of setting corrective quantity 4 to an initial value is omitted. In steps 907, 908, controller 10 calculates values 3, 4 as digital numerical data.

Then, controller 10 updates the I/Q phase compensation quantity so that value 3 and value 4 are equal to each other, based on the calculated results from steps 907, 908. Specifically, controller 10 calculates value 4/value 3 and corrects the I/Q phase compensation quantity into multiples thereof by (value 4/value 3) (step 909).

Subsequently, controller 10 repeats the trial process from step 902 to step 909 a predetermined number of times (step 910).

If the trial process is finished a predetermined number of times, then the mode of compensating for an I/Q phase mismatch is now ended.

According to the present exemplary embodiment, a condition for making value 3 and value 4 equal to each other can be estimated with accuracy, using the ratio of value 3 and value 4. Using such a condition, it is possible to dispense with a conditional branch based on whether the trial process is finished a predetermined number of times in step 910 shown in FIG. 35, and complete the mode of compensating for an I/Q amplitude mismatch in one trial process.

The invention claimed is:

1. A signal processing circuit for compensating for an I/Q mismatch including an I/Q amplitude mismatch representative of a discrepancy between the amplitudes of I/O components of an output signal from an orthogonal modulator and an I/Q phase mismatch representative of a deviation from 90 degrees of the phase difference between the I/O components of the output signal from the orthogonal modulator, comprising:

test signal generating means for successively generating test signals represented by four points, which comprise two sets of two points positioned in point symmetry with respect to an origin of an I/Q orthogonal coordinate system, and outputting the test signals to a baseband port of said orthogonal modulator;

detecting means for detecting and outputting the amplitude of an envelope of the output signal from said orthogonal modulator when said test signals represented by four points are generated;

calculating means for calculating and outputting an average value of output signals from said detector when the test signals represented by the two points of each set are generated; and control means for adjusting the amplitudes and/or phases of said test signals so that the average values produced when the test signals represented by the two sets of the two points are generated are equal to each other.

2. A signal processing circuit according to claim 1, wherein said control means adjusts the amplitudes and/or phases of said test signals based on magnitudes of the average values produced when the test signals represented by the two sets of the two points are generated.

3. A signal processing circuit according to claim 1, wherein said test signal generating means generates a first test signal represented by a point whose I component is of a positive first value and whose Q component is of a positive second value, a second test signal represented by a point whose I component is of a negative first value and whose Q component is of a negative second value, a third test signal represented by a point whose I component is of a negative third value and whose Q component is of a positive fourth value, and a fourth test signal represented by a point whose I component is of a positive third value and whose Q component is of a negative fourth value;

said calculating means calculates average value 1 of output signals from said detector when said first and second test signals are generated, and average value 2 of output signals from said detector when said third and fourth test signals are generated; and said control means performs a repetitive process of estimating the fourth value from said first value at the time said average value 1 and said average value 2 are equal to each other, by a predetermined number of times, and calculates said I/Q mismatch quantity based on said first through fourth values after said repetitive process is performed by the predetermined number of times.

4. A signal processing circuit according to claim 3, wherein said control means adds or subtracts corrective quantities preset with respect to said first through fourth values based on the magnitudes of said average value 1 and said average value 2 each time said repetitive process is performed once, and thereafter updates said corrective quantities.

5. A signal processing circuit according to claim 3, wherein said test signal generating means sets said second value and said third value to zero; and said control means calculates an I/Q amplitude mismatch quantity as said I/Q mismatch quantity based on a ratio of said first value and said fourth value after said repetitive process is performed by the predetermined number of times.

6. A signal processing circuit according to claim 3, wherein said control means calculates an I/Q phase mismatch quantity as said I/Q mismatch quantity based on said first through fourth values after said repetitive process is performed by the predetermined number of times.

7. A signal processing circuit according to claim 3, wherein said test signal generating means sets said second value and said third value to zero;

said control means calculates an I/Q amplitude mismatch quantity as said I/Q mismatch quantity based on a ratio of said first value and said fourth value after said repetitive process is performed by the predetermined number of times;

thereafter, said test signal generating means sets said second value and said third value to values other than zero; and said control means calculates an I/Q phase mismatch quantity as said I/Q mismatch quantity based on said first through fourth values and the calculated I/Q amplitude mismatch quantity after said repetitive process is performed again by the predetermined number of times.

8. A signal processing circuit according to claim 3, wherein said control means performs said repetitive process only once based on a comparison with a threshold value.

9. A signal processing circuit according to claim 3, wherein said control means calculates a ratio of said first through fourth values before being updated and said first through fourth values after being updated when said first through fourth values are updated, compares the calculated ratio with a preset threshold value, and determines the number of times that said repetitive process is to be performed, based on the comparison result.

10. A signal processing circuit according to claim 3, further comprising:

an I/Q mismatch compensating means for being supplied with a transmission baseband signal and correcting said transmission baseband signal based on a preset compensation quantity; and a switch for selecting either one of an output signal from said test signal generating means and an output signal from said I/Q mismatch compensating means, and outputting the selected output signal to said orthogonal modulator;

wherein said control means sets said compensation quantity in said I/Q mismatch compensating means based on the calculated I/Q mismatch quantity.

11. A signal processing circuit according to claim 1, further comprising:

a switch for selecting either one of a transmission baseband signal and an output signal from said test signal generating means; and an I/Q mismatch compensating means for being supplied with a signal selected by said switch, correcting the supplied signal based on a preset compensation quantity, and outputs the corrected signal to the baseband port of said orthogonal modulator;

wherein said control means controls said switch to select the output signal from said test signal generating means;

said test signal generating means generates a first test signal represented by a point whose I component is of a positive first value and whose Q component is of a positive second value, a second test signal represented by a point whose I component is of a negative first value and whose Q component is of a negative second value, a third test signal represented by a point whose I component is of the negative second value and whose Q component is of the positive first value, and a fourth test signal represented by a point whose I component is of the positive second value and whose Q component is of the negative first value;

said calculating means calculates average value 1 of output signals from said detector when said first and second test signals are generated, and average value 2 of output signals from said detector when said third and fourth test signals are generated; and said control means performs a repetitive process of estimating said compensation quantity of said I/Q mismatch compensating means at the time said average value 1 and said average value 2 are equal to each other, and setting the estimated compensation quantity in said I/Q mismatch compensating means, by a predetermined number of times.

12. A signal processing circuit according to claim 11, wherein said control means adds or subtracts a corrective quantity preset with respect to said compensation quantity of said I/Q mismatch compensating means based on the magnitudes of said average value 1 and said average value 2 each time said repetitive process is performed once, and thereafter updates said corrective quantity.

13. A signal processing circuit according to claim 11, wherein said test signal generating means sets said second value to zero; and
   said control means sets a compensation quantity for compensating for said I/Q amplitude mismatch as said compensation quantity of said I/Q mismatch compensating means.

14. A signal processing circuit according to claim 11, wherein said test signal generating means equalizes said first value and said second value to each other; and
   said control means sets a compensation quantity for compensating for said I/Q phase mismatch as said compensation quantity of said I/Q mismatch compensating means.

15. A signal processing circuit according to claim 11, wherein said control means performs said repetitive process only once based on a comparison with a threshold value.

16. A signal processing circuit according to claim 11, wherein said control means calculates a ratio of said compensation quantity of said I/Q mismatch compensating means before being updated and said compensation quantity of said I/Q mismatch compensating means after being updated when said compensation quantity of said I/Q mismatch compensating means is updated, compares the calculated ratio with a preset threshold value, and determines the number of times that said repetitive process is to be performed, based on the comparison result.

17. A signal processing circuit according to claim 1, wherein said test signal generating means generates test signals represented by four points which comprise a set of two points on an I axis which are positioned in point symmetry with respect to the origin of the I/Q orthogonal coordinate system and a set of two point on a Q axis which are positioned in point symmetry with respect to the origin of the I/Q orthogonal coordinate system; and
   said control means calculates an I/Q amplitude mismatch quantity as said I/Q mismatch quantity when the test signals represented by the four points are generated.

18. A signal processing circuit according to claim 1, wherein said test signal generating means generates test signals represented by four points which comprise a set of two points which are positioned in point symmetry with respect to the origin of the I/Q orthogonal coordinate system and located in the first and third quadrants and a set of two points which are positioned in point symmetry with respect to the origin of the I/Q orthogonal coordinate system and located in the second and fourth quadrants; and
   said control means calculates an I/Q phase mismatch quantity as said I/Q mismatch quantity when the test signals represented by the four points are generated.

19. A signal processing circuit according to claim 1, having a mode for compensating the I/Q amplitude mismatch and a mode for compensating the I/Q phase mismatch.

20. A signal processing circuit according to claim 19, wherein said control means calculates an I/Q amplitude mismatch quantity in said mode for compensating the I/Q amplitude mismatch, and thereafter calculates an I/Q phase mismatch quantity using the calculated I/Q amplitude mismatch quantity in said mode for compensating the I/Q phase mismatch.

21. A signal processing circuit according to claim 1, further comprising:
   means for compensating for a DC offset of said orthogonal modulator;
   wherein said control means compensates for said I/Q mismatch after the DC offset of said orthogonal modulator is compensated for.

22. A signal processing circuit according to claim 1, wherein said detecting means outputs a signal proportional to a power of the amplitude of an envelope of the output signal from said orthogonal modulator, said power being of a value greater than 1 and smaller than 3.

23. A signal processing circuit according to claim 1, wherein said detecting means outputs a signal proportional to the square of the amplitude of an envelope of the output signal from said orthogonal modulator.

* * * * *